(12) United States Patent
Balachandran et al.

(10) Patent No.: US 6,611,515 B1
(45) Date of Patent: Aug. 26, 2003

(54) SYSTEM AND METHOD FOR LINK AND MEDIA ACCESS CONTROL LAYER TRANSACTION COMPLETION PROCEDURES

(75) Inventors: Krishna Balachandran, Middletown, NJ (US); Richard P. Ejzak, Wheaton, IL (US); Sanjiv Nanda, Plainsboro, NJ (US); Shiv M. Seth, Naperville, IL (US); Stanley Vitebsky, Parsippany, NJ (US); William Waung, Burnaby (CA)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/286,273

(22) Filed: Apr. 5, 1999

Related U.S. Application Data

(60) Provisional application No. 60/085,752, filed on May 17, 1998.

(51) Int. Cl.[7] .............................................. H04G 3/24
(52) U.S. Cl. .................... 370/349; 370/229; 714/748
(58) Field of Search ................................. 370/229, 230, 370/231, 235, 236, 346, 349; 714/748, 749

(56) References Cited

U.S. PATENT DOCUMENTS 5,701,298 A 12/1997 Diachina et al.
6,144,653 A * 11/2000 Persson et al. ............. 370/337

OTHER PUBLICATIONS

Furguson,M.J.: "Formalization and Validation of the Radio Link Protocol(RLP1)" *Computer Networks and ISDN Systems*, vol. 29, No. 3, Feb. 1, 1997, p. 357–372.

* cited by examiner

*Primary Examiner*—Lee Nguyen

(57) ABSTRACT

A system and method of implementing a radio link protocol completion oriented packet data communication system. A data backlog is described with a media access control layer controller and transmitting a BEGIN protocol data unit containing a flag transmitted to a receiver. A media access control layer transaction is initiated in response to the transmitting of the BEGIN protocol data unit.

39 Claims, 34 Drawing Sheets

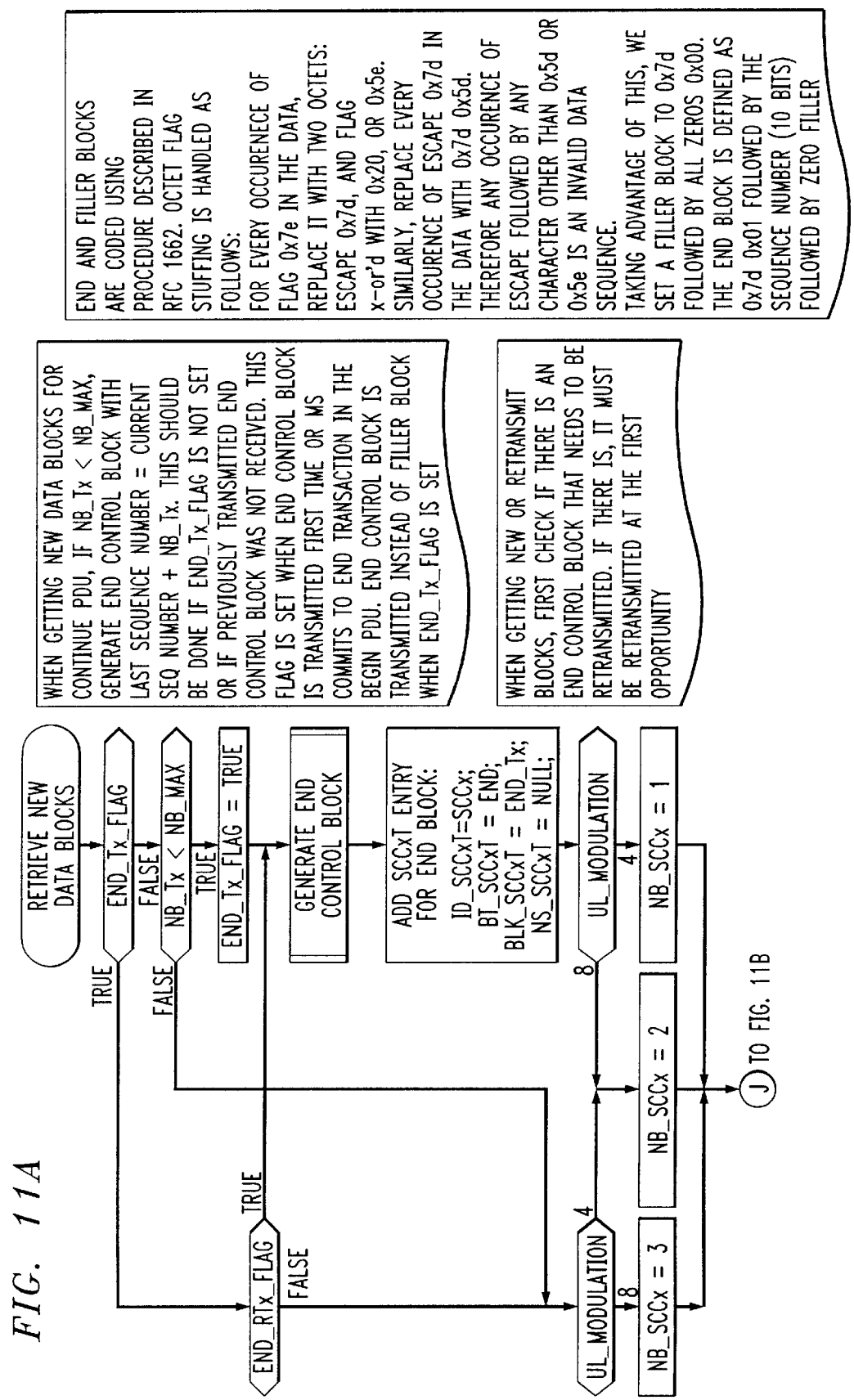

FIG. 12A
225

CONSTRUCT PDU

BEGIN → NEXT_PDU ARQ_STATUS

CONTINUE_NEW OR CONTINUE_srej

| FIELD | PDU_Tx = VALUE |
|---|---|
| SAPI | SAPI |
| CF | 0 |
| PI | PI_CURRENT |
| FT | 10 |
| MI | UL_MODE |
| MPC | MPC_CURRENT |
| DIR | DIR_CURRENT |
| BP | BP_CURRENT |
| MC | MC_CURRENT |
| X | 0 |
| AMI | AMI_CURRENT |
| MSID | MSID |
| X | 0 |
| X | 0 |
| TS | NB_Tx |
| L3 DATA | BLK_SCCxT(SCCx) |

| FIELD | PDU_Tx = VALUE |
|---|---|
| SAPI | SAPI |
| CF | 0 |
| PI | PI_CURRENT |
| FT | 10 |
| X | 0 |
| EBR | END_Rx_FLAG |
| NND | NND_CURRENT |
| X | 0 |
| BP | BP_CURRENT |
| MC | MC_CURRENT |
| URR | URR_CURRENT |
| PBMP | 1 |
| IRBP | 0 |
| BOW | BOW_Rx |
| PBM | PBM_Rx |
| PBMC | PBMC_Rx |
| BSN | NR_Rx |
| PBML | BML_Rx |
| BIT MAP | BLK_SCCxT(SCCx) |

| FIELD | PDU_Tx = VALUE |
|---|---|
| SAPI | SAPI |
| CF | 1 |
| PI | PI_CURRENT |
| BSN | NS_SCCxT OF FIRST ENTRY WITH ID_SCCxT = SCCx AND BT_SCCxT = DATA |
| DATA | BLK_SCCxT FOR ALL ENTRIES WHERE ID_SCCxT = SCCx |

EXIT

FIG. 12B
230

| TRANSMIT TABLE TxT | | | |
|---|---|---|---|
| B_TxT | NS_TxT | R_TxT | BLK_TxT |
| 0 | 0 | 0 OR 1 | SGM_Tx |
| 1 | 1 | 0 OR 1 | SGM_Tx |
| 1 | 2 | 0 OR 1 | SGM_Tx |
| . | . | . | . |
| . | . | . | . |
| . | . | . | . |

FIG. 12C
235

| SUB-CHANNEL CONTROLLERS TRANSMIT TABLE SCCxT | | | |
|---|---|---|---|
| ID_SCCxT | NS_SCCxT | BT_SCCxT | BLK_SCCxT |
| 0 | 0 | DATA | SGM_Tx |
| 0 | 1 | DATA | SGM_Tx |
| 0 | 2 | DATA | SGM_Tx |
| 2 | NULL | END | END_Tx |
| 2 | 3 | DATA | SGM_Tx |
| 2 | 4 | DATA | SGM_Tx |
| 3 | 5 | DATA | SGM_Tx |
| 3 | NULL | END | END_Tx |
| 8 | NULL | ARQ_STATUS | BF_Tx |

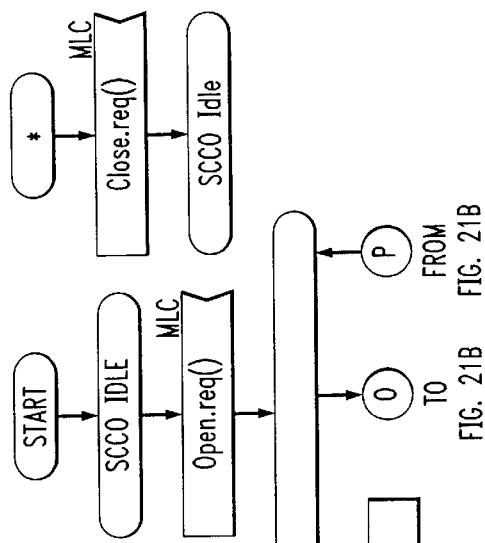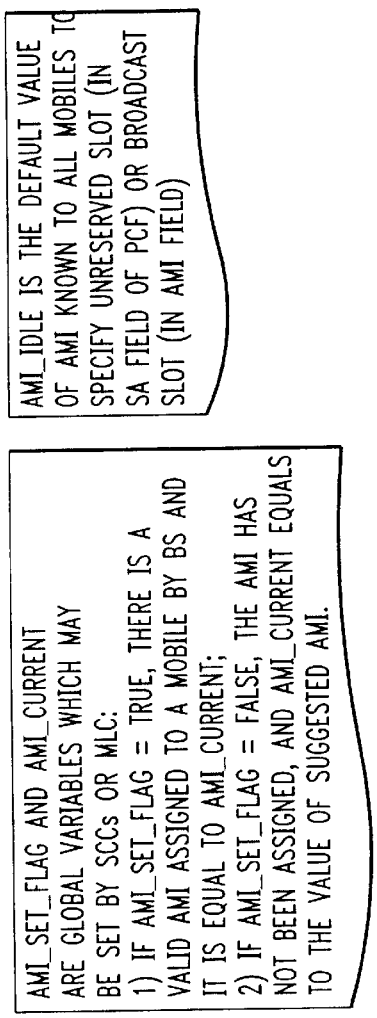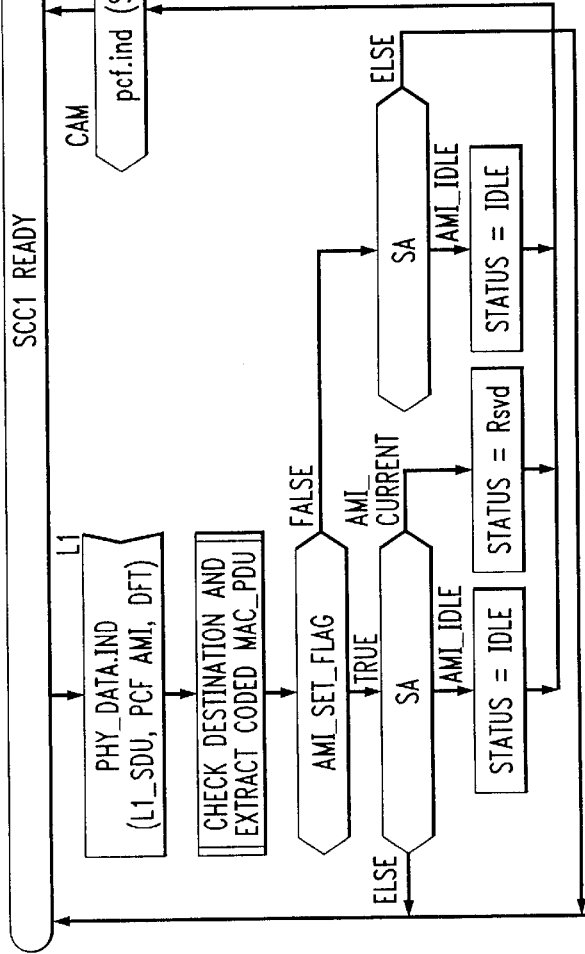
FIG. 21A

SYSTEM AND METHOD FOR LINK AND MEDIA ACCESS CONTROL LAYER TRANSACTION COMPLETION PROCEDURES

CROSS REFERENCE TO RELATED APPLICATION

This application claims the benefit of U.S. Provisional Application, Ser. No. 60/085,752 filed May 17, 1998, and entitled System and Method Medium Access Control in a Wireless Data Communication System.

BACKGROUND OF THE INVENTION

This invention relates to link and media access layer transaction initiation procedures in a communication system, and more particularly to such procedures in time slotted communication systems.

Link layer recovery protocols are used for error and loss recovery in data communication systems. Link layer recovery is especially crucial for wireless communications due to the particularly harsh loss and error characteristics of the link.

For cellular circuit data systems (eg. IS-130), supervisory frames are typically exchanged between the Radio Link Protocol (RLP) peer entities for connection establishment and for disconnection. The receiver RLP is not provided with advance knowledge of the duration of the connection or the last valid sequence number. The Mobile Data Link Protocol (MDLP) operation in CDPD is similar, and the protocol state is maintained across periods of inactivity.

Packet data transactions tend to be bursty with possibly long periods of inactivity between transactions. For mobile stations involved in intermittent transactions, with long inter-transaction times (even though each transaction may involve significant data transfer), maintaining RLP state information across long idle periods is a very inefficient use of network resources. Furthermore, the exchange of supervisory frames for a disconnect uses valuable air interface resources, and may result in some additional delay for establishing new connections. Therefore, a procedure for quickly, efficiently and gracefully ending transactions is desirable, especially when the link layer protocol is not situated back in the network. The GSM General Packet Radio Service (GPRS) uses a different approach. In the case of GPRS, bits are reserved in every Radio Link Control (RLC) block in order to indicate the end of a temporary block flow. This additional overhead in every RLC block is inefficient for long transactions, and leads to some loss in achievable throughput. The present invention is directed to overcoming, or at least reducing, the effects of one or more of the problems set forth above.

SUMMARY OF THE INVENTION

In accordance with the present invention, there is provided a system and method of implementing a radio link protocol completion process for a transaction oriented packet data communication system. The method performs the steps of determining a data backlog with a media access control layer controller and transmitting a BEGIN protocol data unit (PDU) containing a flag (a transaction size indicator) to a receiver. The method further performs the step of initiating a media access control layer transaction in response to the transmitting of the BEGIN PDU.

Also in accordance with the present invention, a transaction oriented packet data communication system is described. The system comprises a media access control layer controller for determining a data backlog in a media access control layer buffer a media access control layer transmitter for transmitting a BEGIN protocol data unit containing a flag (transaction size indicator) to a receiver. The system also includes a means for initiating a media access control layer transaction in response to the transmitting of the BEGIN Protocol Data Unit.

These and other features and advantages of the present invention will become apparent from the following detailed description, the accompanying drawings and the appended claims.

BRIEF DESCRIPTION OF THE DRAWINGS

FIG. 12 describes a construct Protocol Data Unit (PDU) process, a transmit (TxT) table, and a sub-channel controllers transmit (SCCxT) table used by the TCTX block of FIG. 4;

DETAILED DESCRIPTION

Figure 1:
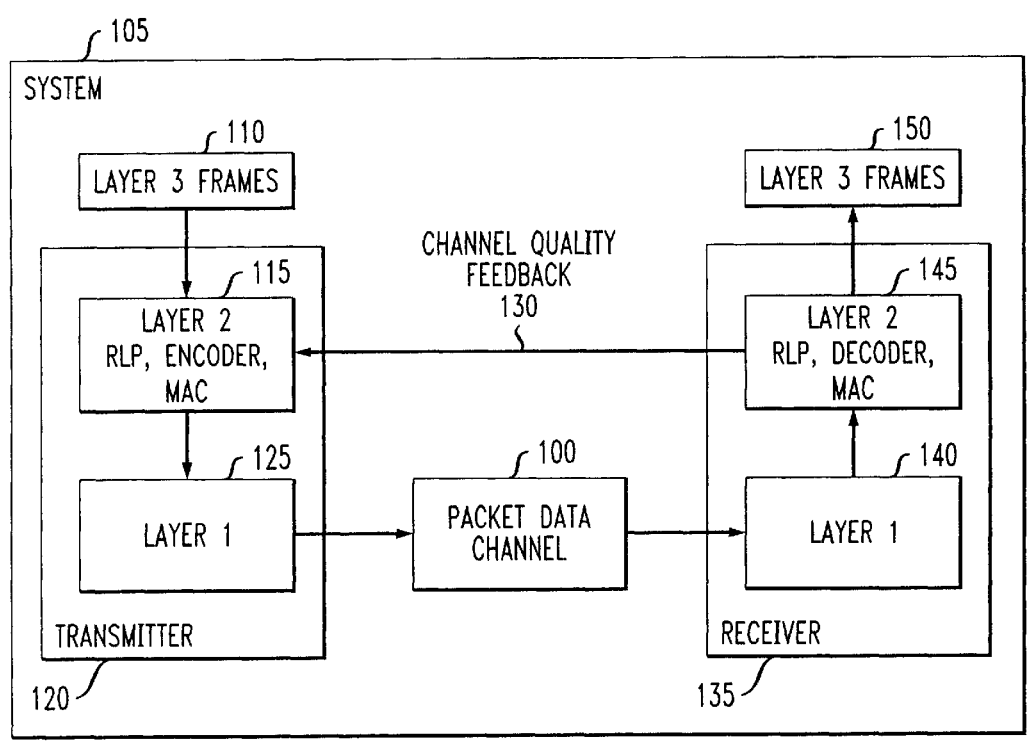
FIG. 1 shows a block diagram of a communication system illustrating the operation on a packet data channel in accordance with the invention.

In describing the invention this application uses the media access control (MAC) layer assumptions which are based on the Open System Interconnections (OSI) model. OSI is an internationally accepted frame work of standards for communication between different systems made by different vendors. Most of the dominant communication protocols used today have a structure based on the OSI model. The OSI model organizes the communication process into seven different categories and places these categories in layered sequence based on their relation to the user. Layer 7 through 4 deal with the end to end communication message source and the message destination. While Layers 3 through 1 deal with network access.

Layer 1, the physical layer, deals with the physical means of sending data over lines i.e. the electrical, mechanical and functional control of data circuits. Layer 2, the data link layer, deals with procedures and protocols for operating communication lines. Layer 3, the network layer, determines how data is transferred between computers and routing within and between individual networks.

It is appreciated that the packet data channel is capable of supporting multiple modulations. The MAC layer is provided with frames of Layer 3 and translates them into a byte stream using flag delimiters. A radio link protocol (RLP), also referred to as a retransmission link protocol, is used to transfer frames of Layer 2 between a cell and the mobile station and vice versa. The byte stream of Layer 3 is segmented into RLP frames, and a sliding window retransmission scheme is used for in-sequence delivery and recovery.

MAC layer transaction preferably starts with the transmission of a BEGIN frame. On the uplink and downlink, the MAC layer converts the frames of Layer 3 into a byte stream and packs the byte stream into a series of CONTINUE frames. The last new data burst of a transaction is transmitted using an END frame.

The BEGIN frame of each transaction is transmitted using 4-level modulation in a stop and wait mode to obtain an acknowledgment from the receiver. On reception of the BEGIN frame, the receiver initializes an RLP. The BEGIN frame is also used to initialize a partial echo (PE) for the transaction, and to specify the mode of operation for subsequent automatic retransmission request (ARQ) mode CONTINUE frames in that transaction.

There are two possible modes of operation for ARQ mode CONTINUE frames on the downlink and uplink. The first is incremental redundancy (mode 0) and the second is fixed coding (mode 1). It is appreciated that both mode 0 and mode 1 operate with either fixed modulation or adaptive modulation.

ARQ checks for errors in transmitted data. The sender encodes an error-detection (check) field in the transmitted data based on the contents of the message. The receiver then recalculates the check field and compares it with the check field received. If the check fields match, an ACK (acknowledgment) is transmitted to the sender. If both check fields do not match, a NAK (negative acknowledgment) is returned, and the sender retransmits the message.

For both uplink and downlink transmissions, bitmap feedback in the form of an ARQ status is provided. In addition, ACK/NAK feedback is provided on a per time slot basis for uplink transmissions.

FIG. 1 shows a high level block diagram of operation on the packet data channel 100 in accordance with the invention. A transaction oriented packet data communication system 105 is shown where Layer 3 frames 110 are provided to the Layer 2, MAC Layer 115, at the transmitter 120 and are translated into a byte stream using flags for demarcation. This permits the MAC layer 115 to provide a unified transport mechanism for different Layer 3 protocols. This byte stream is segmented into RLP frames and assigned a frame sequence number (FSN). The FSN is not explicitly transmitted as part of the RLP frame.

For higher throughput in either mode, Layer 1 125 data is mapped into symbols chosen from a 4-level, 8-level or 16-level modulation based on knowledge of Layer 2 backlog and channel quality feedback 130 from the receiver 135. The channel quality is measured in terms of the signal to interference plus noise ratio, $$\frac{C}{I+N}$$

at the input to the decoder in the Layer 2 block 140 via physical layer 145 at the receiver 135. The decoder 140 then outputs the Layer 3 frames 150.

The IS-136 Digital Control Channel uses a temporary mobile station identifier also called a Partial Echo (PE). The PE is assumed to be an abbreviated Mobile Station Identity (MSID), i.e., the last 7 bits of the MSID is treated as the PE. Due to this mechanism, there is a significant probability that two or more active users would use the same PE, and that erroneous protocol states would result frequently due to inability of mobiles to resolve their PE's correctly.

Figure 2:
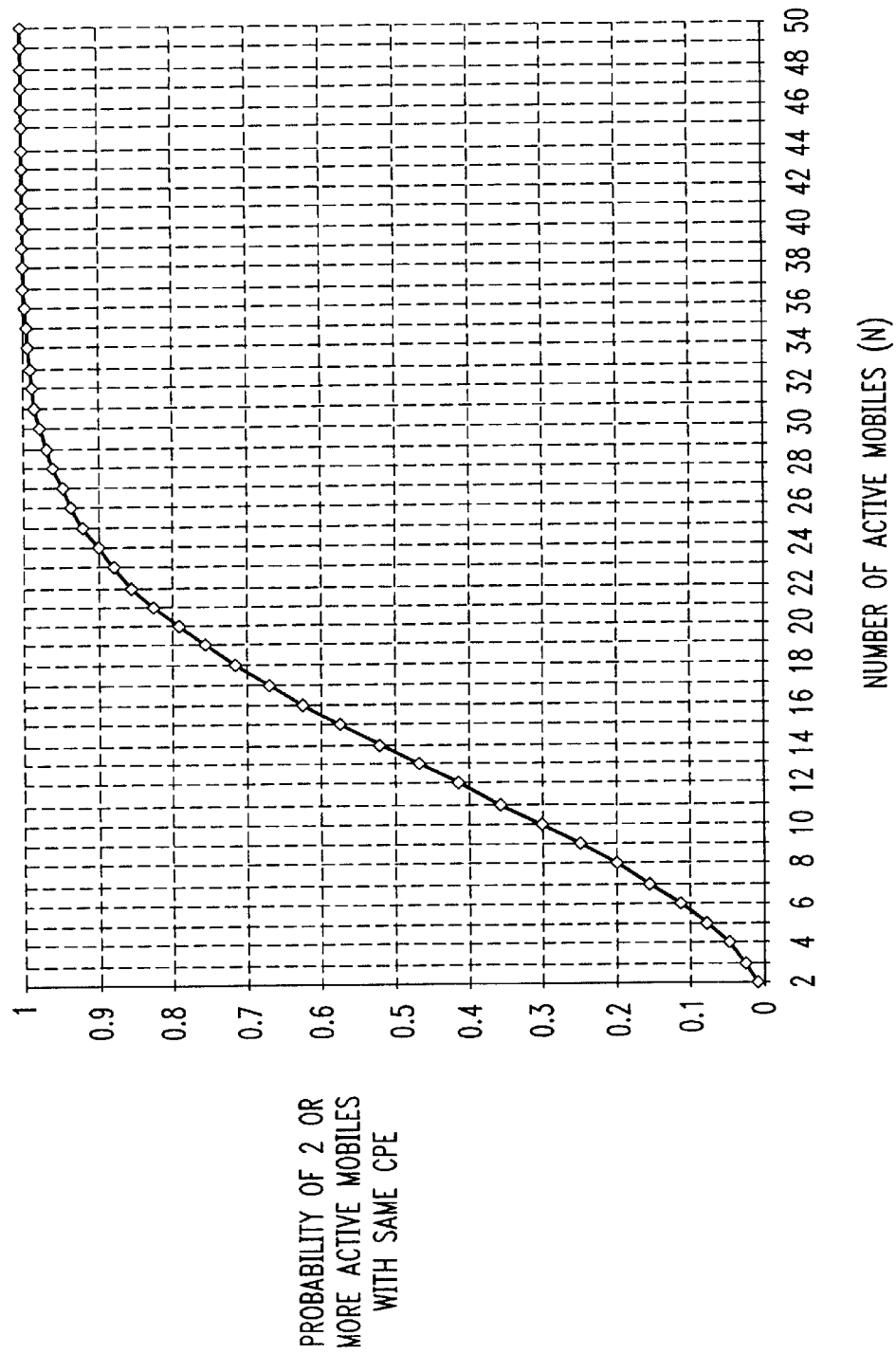
FIG. 2 is a graph showing the probability of two or more active users having the same partial echo.

In FIG. 2, this probability is shown as a function of the number users that are simultaneously active on the channel. In packet data applications (as opposed to voice or circuit data applications), it is quite possible to have ten or more active users at any given time sharing the same channel. In these cases, the probability of partial echo duplication reaches 25% and higher which is unacceptable for proper system operation.

The problem is selectively solved by assigning a PE value (such as a dynamic PE) or an active mobile identity (AMI) to every mobile for all downlink transactions, and for uplink transactions which require more than a single burst. The AMI serves as a unique (assigned) local identifier to be used by the transmitter and the receiver for the duration of the transaction on a particular packet data channel. A new AMI is assigned for each new transaction thus eliminating the potential for ambiguity. The same AMI may be used in either direction (i.e., the AMI assignment is initiated by the uplink or downlink transaction, whichever begins first, and remains assigned till the end of data transfer in both directions).

A new transaction is initiated when a transmission opportunity is identified and if the transmit buffer contains new data. Downlink transactions may be ACK or NAK but uplink transactions are always ACK. Preferably every MAC layer transaction starts with a BEGIN Protocol Data Unit (PDU) handshake and proceeds with the transmission of a series of CONTINUE PDUs. ARQ mode CONTINUE PDUs may be transmitted in Incremental redundancy Mode (mode 0) or Fixed coding Mode (mode 1), and ARQ procedures for the two modes are different. Supervisory ARQ Status PDUs are used to provide the transmitter with periodic feedback of the receiver state.

The BEGIN PDU handshake (i.e., ACK transfer of the BEGIN PDU) establishes the AMI and the mode of operation for subsequent CONTINUE PDUs. It is appreciated that on multi-rate channels, it may also selectively be used to carry out phase assignment.

Base stations (also know as cells) selectively initiate downlink transactions through the transmission of a BEGIN PDU. The parameters indicated by the BEGIN PDU include: a Mobile Station Identity (MSID); an ARQ Mode (AM) indicating whether the transaction is ACK or NAK; a Poll Indicator (PI) for ACK transactions indicating whether the mobile station is required to provide an ACK via an ARQ Status PDU; an AMI value to be assigned to the mobile station; a Mode Indicator (MI) indicating whether the mode of operation for subsequent downlink CONTINUE PDUs is Fixed Coding or Incremental Redundancy and a Phase Assignment (PA) indicating the phase for the transfer of subsequent data on the uplink or downlink.

If an AMI has already been assigned to the mobile station, the base station assigns the same AMI value within the BEGIN PDU. If the mobile station does not have a valid AMI, the base station randomly chooses an AMI value from the set of allowable values and assigns it to the mobile station using the BEGIN PDU. The base station Transmit Controller initializes a RLP in the indicated mode (IR or FC) on transmission of the BEGIN PDU. The mobile station Receive Controller initializes a peer RLP in the assigned mode on receipt of the BEGIN PDU.

Figure 3:
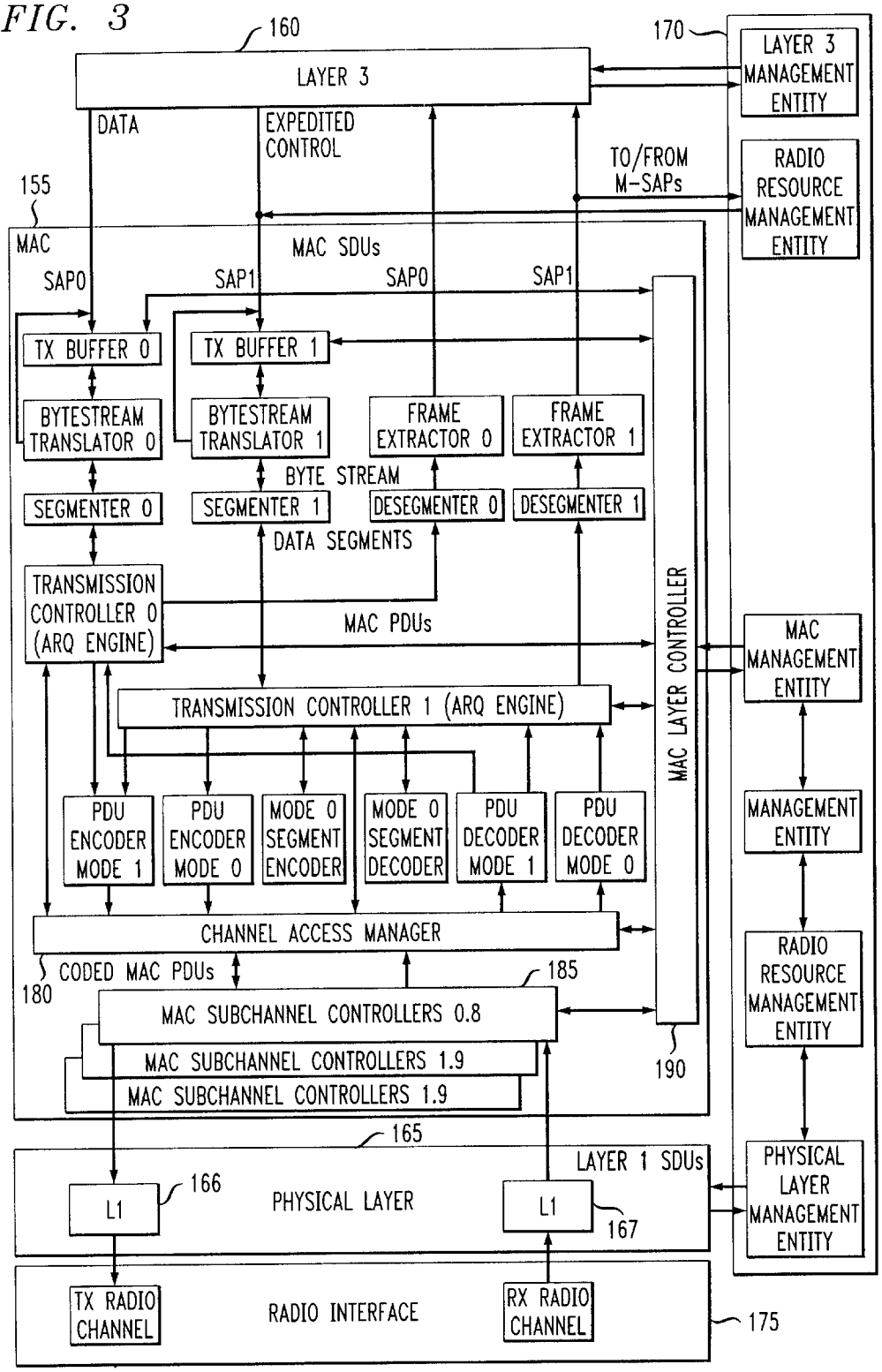
FIG. 3 is a block diagram illustrating an examplary implementation of a Media Access Control (MAC) layer from the Layer 2 block in FIG. 1.

FIG. 3 illustrates an example implementation of the Media Access Control (MAC) 155 Layer in a duplex wireless data communication system. The MAC 155 interfaces with Layer 3 160 (network layer), physical layer (Layer 1) 165 (which includes a MAC layer transmitter 166 and MAC layer receiver 167) and with the management entity 170. In this example, the MAC 155 provides data and expedited control delivery services to Layer 3 160 and other higher layer entities. The MAC 155 uses Layer 1 165, via the MAC layer transmitter 166, for delivery of its PDUs over a radio interface 175. The management entity 170 initializes, terminates, suspends, resumes and configures MAC 155 operation. The management entity 170 also monitors the MAC 155 for errors. The management entity 170 also provides dynamic PE management fo the transaction packet data communication system 105, FIG. 1. The MAC 155 includes two Service Access Points (SAPs): SAP1 for regular data and SAP0 for expedited data and control. Each SAP has a corresponding transmit buffer (TXB), segmenter (SGM), desegmenter (DSGM), frame extractor (FRX) and transmission controller (TC). A channel access manager (CAM) 180 multiplexes the PDUs from the different transmission controllers (also known as ARQ engine) TC0 and TC1, FIG. 3, and provides priority scheduling. The CAM 180 is also responsible for uplink random access. A MAC subchannel controllers (SCC) 185, preferably up to 9 (SCC0 through SCC8), control transmission over each of the wireless data subchannels. The MAC Layer Controller (MLC) 190 controls overall MAC configuration and interfaces with management entity 170. PDU encoders (PENC0 and PENC1) and decoders (PDEC0 and PDEC1) provide channel coding/decoding for the MAC PDUs in mode 0 (incremental redundancy) or mode 1 (fixed coding). A mode 0 segment encoder (SENC0) and decoder (SDEC0) provide coding/decoding, interleaving/deinterleaving and blocking/deblocking in incremental redundancy mode of transmission.

Figure 4:
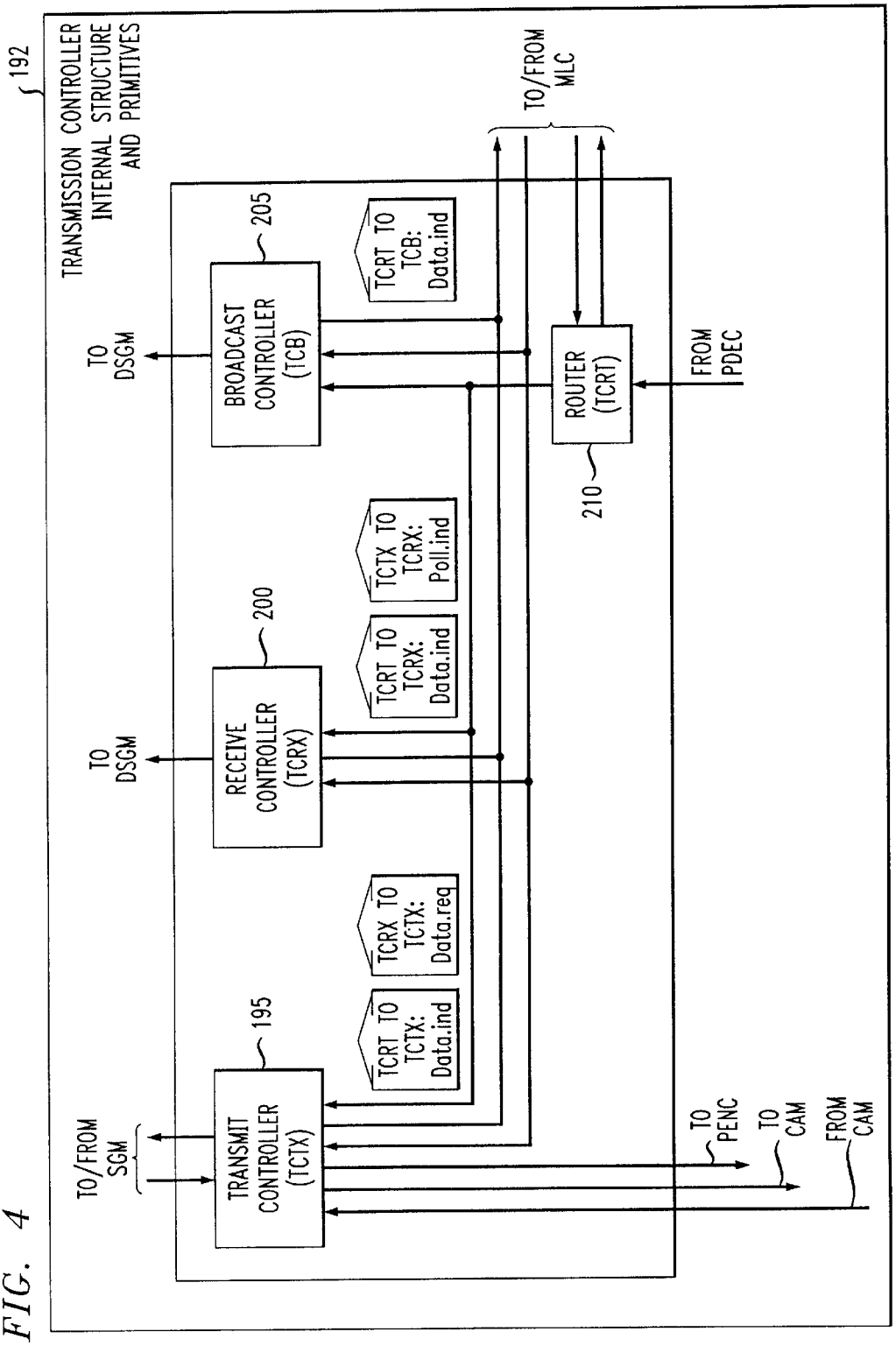
FIG. 4 is a block diagram describing the internal structure of a mobile station MAC transmission controller block shown in FIG. 3.

FIG. 4 shows internal structure of a mobile station's MAC transmission controller (TC) from FIG. 3 and located within the MAC layer 2 115, FIG. 1, of the transmitter 120. The transmission controller 192 consists of the following sub-blocks: a transmit controller (TCTX) 195, receive controller (TCRX) 200, broadcast controller (TCB) 205 and router (TCRT) 210. The transmit controller 195 is connected to the segmenter (SGM0 and SGM1, FIG. 3), PDU encoder (PENC0 and PENC1), CAM 180, MLC 190 and TCRT 210, FIG. 4. The TCRX 200 and TCB 205 controllers are connected to desegmenter (DSGM, FIG. 3), MLC 190 and TCRT 210, FIG. 4. The TCRT 210 is connected to TCTX 195, TCRX 200, TCB 205, MLC 190, FIG. 3, and PDU decoder (PDEC0 or PDEC1).

Figure 5A:
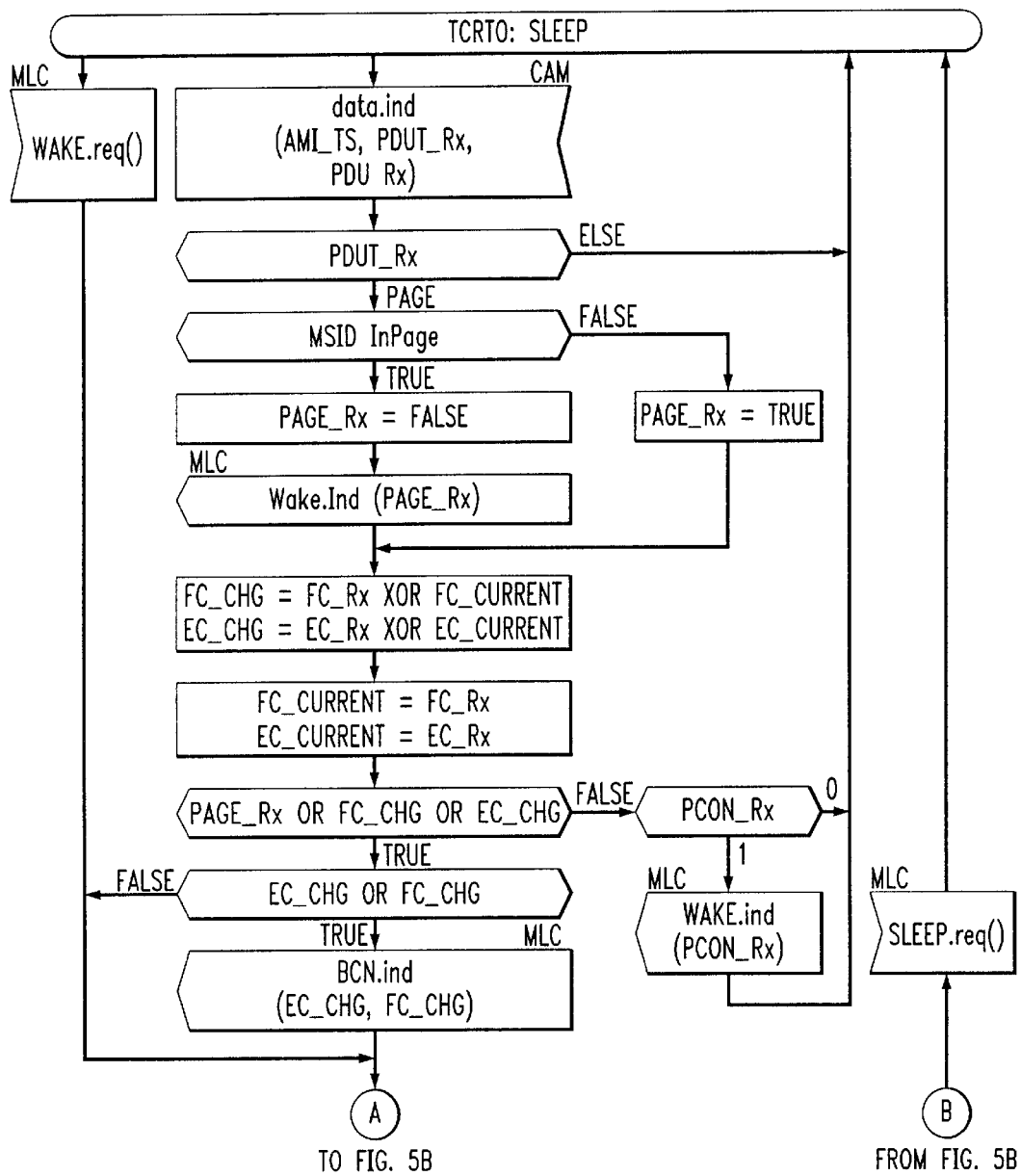
FIG. 5 is a state diagram describing a router process for the mobile station transmission controller described in FIG. 4.
Figure 5B:
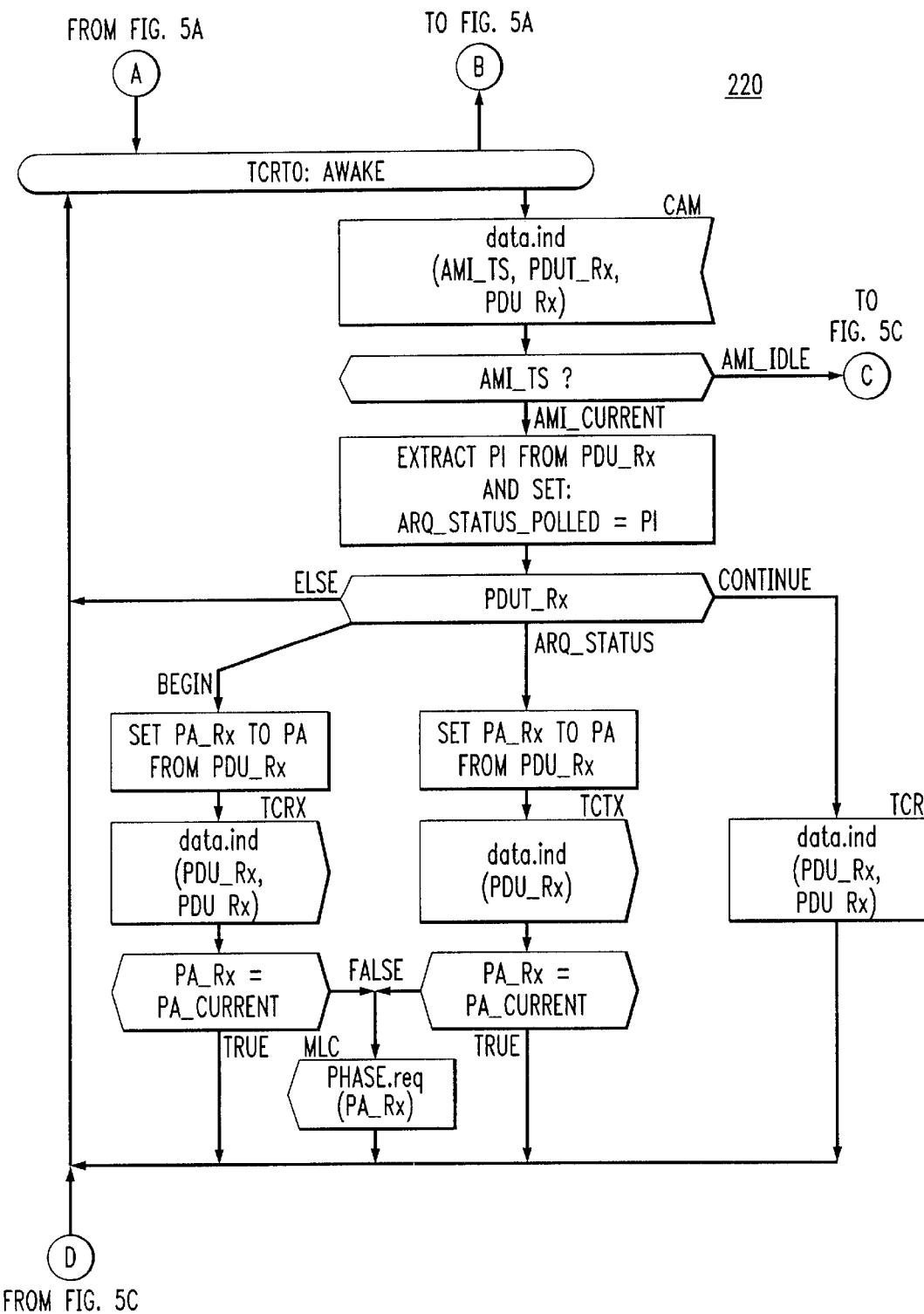
Figure 5C:
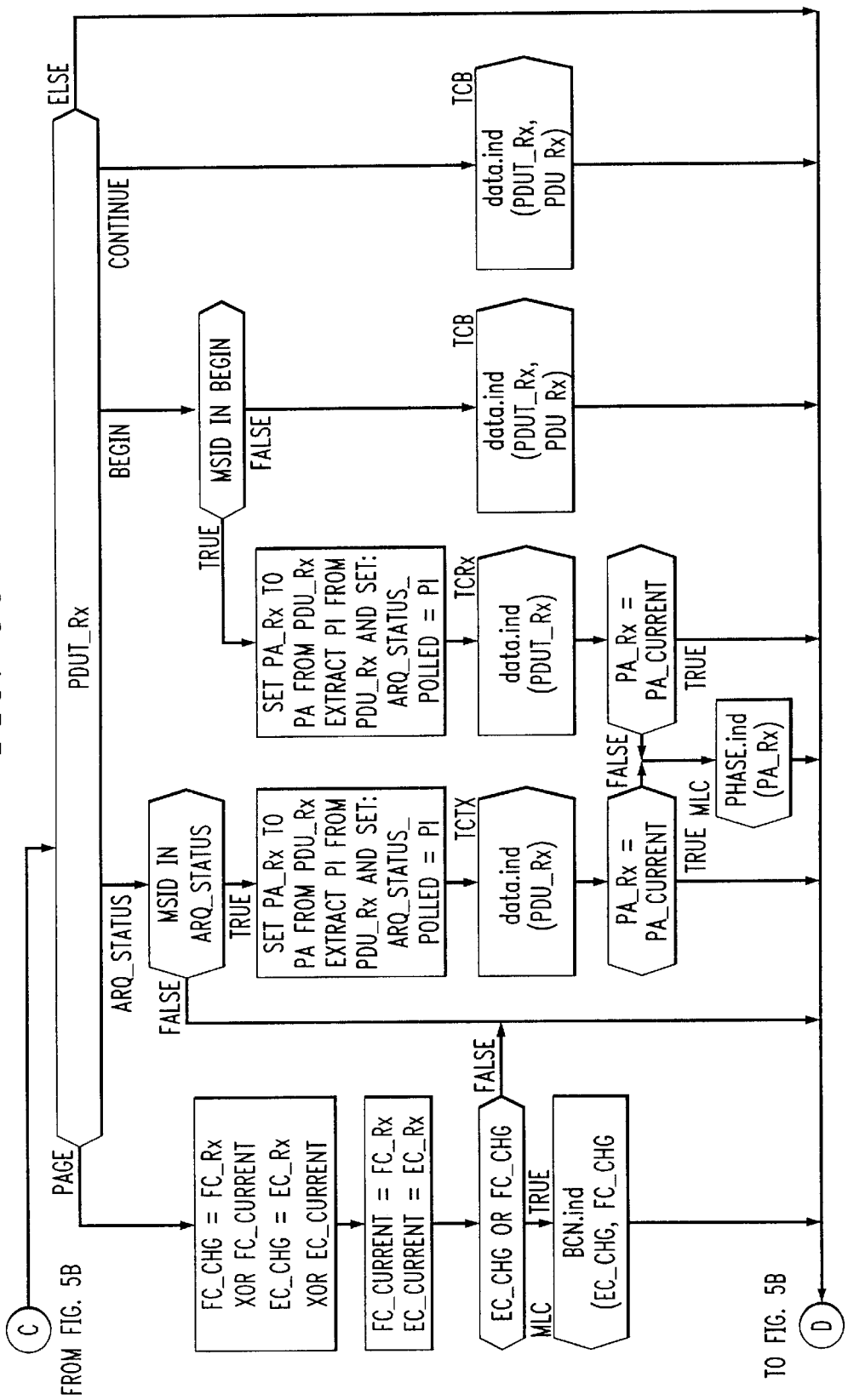

FIG. 5 is a state diagram that describes a router process for the mobile station transmission controller 192 of FIG. 4. The router 210, FIG. 4, preferably transfers decoded frames to an appropriate process (transmit, receive or broadcast controllers) within the transmission controller 192. The router 210 is also preferably employed to receive control information, such as phase assignment, poll indication, broadcast change notification and page continuation indication that may selectively be transmitted to the mobile by a peer transmission controller located at a base station. The router 210 tracks whether the mobile station is in the sleep state 215, FIG. 5, or awake state 220 and whether the AMI has been assigned to the mobile. It is appreciated that depending on the conditions, the router 210, FIG. 4, routes received frames accordingly.

The router 210 receives decoded frames from the CAM 180, FIG. 3, via a data.ind( ) primitive. The router 210, FIG. 4, may be moved by the MLC 190, FIG. 3, from the sleep 215, FIG. 5, to awake 220 states and back via wake.req( ) and sleep.req( ) primitives respectively. The router 210, FIG. 4, issues data.ind( ) primitives to receive, transmit or broadcast controllers (TCRX 200, TCTX 195 and TCB 205) of FIG. 4. The router 210 informs the MLC 190, FIG. 3, about a page or page continuation reception (via wake.ind( )), broadcast change notification reception (via bcn.ind( )) and new phase assignment (via phase.ind( )/phase.req( )).

Figure 6A:
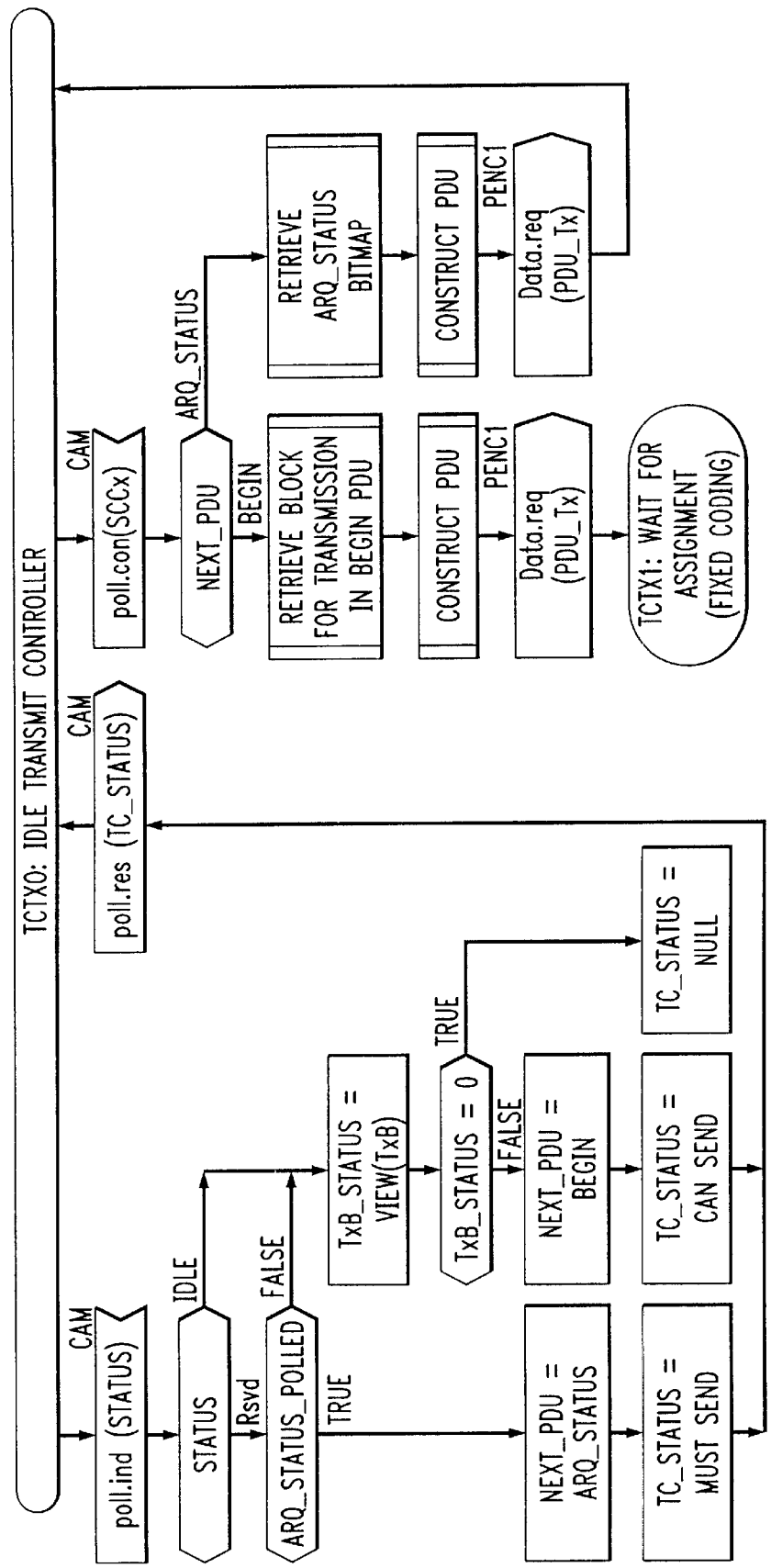
FIG. 6 is a state diagram describing a transmit controller process of the mobile station transmission controller described in FIG. 4.
Figure 6B:
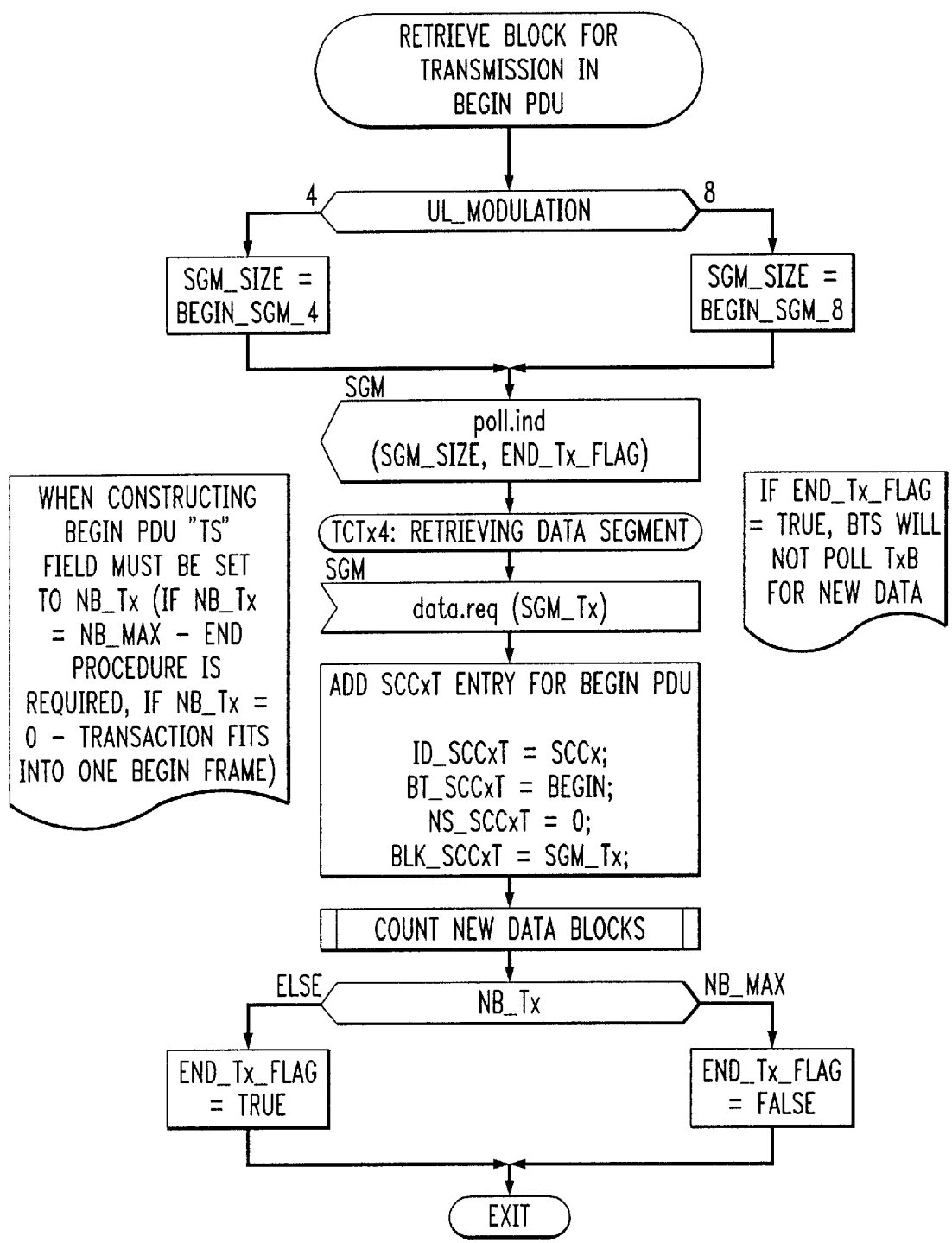

FIG. 6 illustrates the idle state interaction of the transmit controller 192, FIG. 4, with the CAM 180, FIG. 3, and a PDU encoder (PENC0 or PENC1). As seen in FIG. 6 also illustrates an example of a transition to the wait for assignment state.

In FIG. 6 a retrieve block for transmission in a BEGIN PDU process which is preferably executed in the beginning of the uplink transaction so as to retrieve data from the segmenter (SGM0 or SGM1 FIG. 3) and to determine whether the end of transaction process should be executed based on the transaction size.

The transmit controller 192, FIG. 4, receives poll.ind( ) primitives from the CAM 180, FIG. 3, when a transmission opportunity on the uplink occurs. The transmit controller 192, FIG. 4, responds with the poll.res( ) primitive indicating whether the process may selectively send data. In the idle state, the TCTX 195, FIG. 4, sends BEGIN or ARQ STATUS PDUs. If the CAM 180, FIG. 3, provides a transmission opportunity to this TCTX 195, FIG. 4, the TCTX 195 responds with poll.con( ) primitive. The TCTX 195 constructs a PDU and passes the PDU to a PDU encoder via data.req( ) and, in case of BEGIN PDU, enters the wait for assignment state. When retrieving data for BEGIN PDU, the TCTX 192 counts the number of data blocks in a buffer (TXB0 or TXB1, FIG. 3) and determines if it should commit to the end of the transaction (NB_Tx<NB_Max and End_Tx_Flag=True) from the start or if the transaction should start as unbounded (NB_Tx=NB_Max and End_Tx_Flag=False). If the TCTX 195, FIG. 4, commits to the end of transaction from the start the TS (Transaction Size) field in the BEGIN PDU is set to the size of the transaction in data blocks, otherwise it is set to NB_Max (Maximum value of NB_Max is 63). As an example of the of the data block format, the data blocks start with an escape sequence as specified in RFC 1662 which is described in IETF RFC 1662, "PPP in HDLC-Like Framing," July 1994, herein incorporated by reference.

Figure 7A:
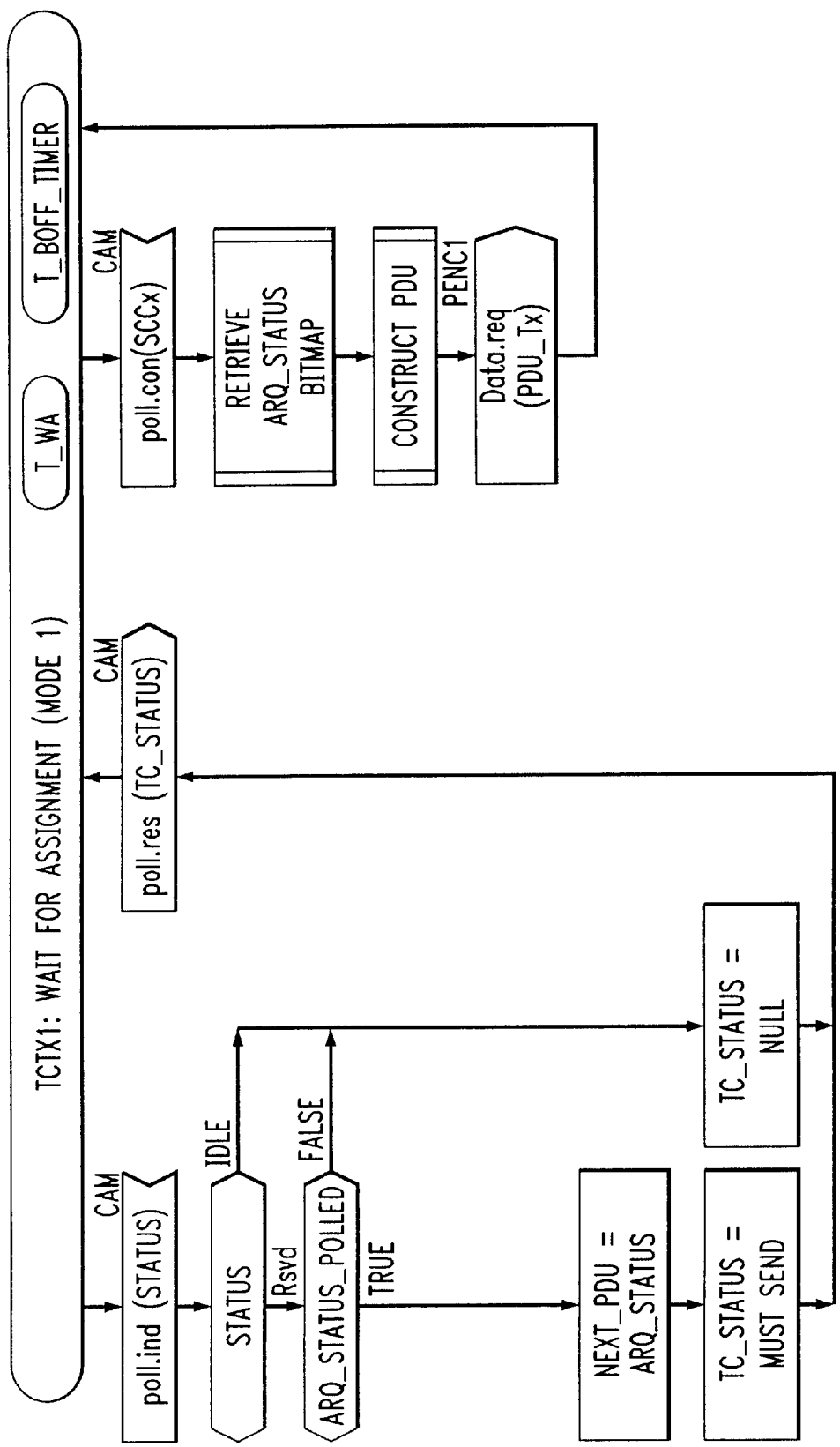
FIG. 7 is a state diagram describing another part of the transmit controller process of the mobile station transmission controller described in FIG. 4.
Figure 7B:
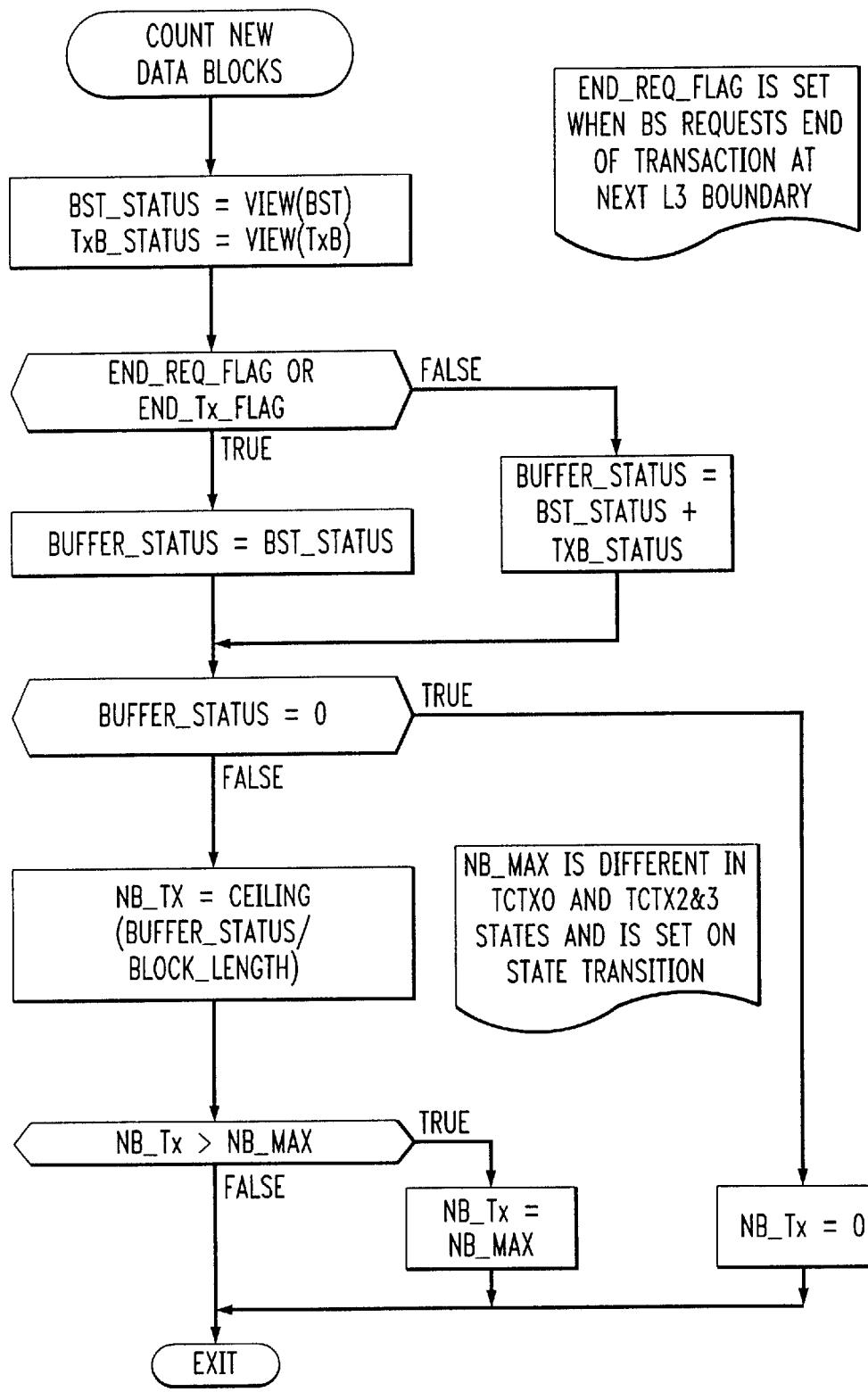
Figure 7C:
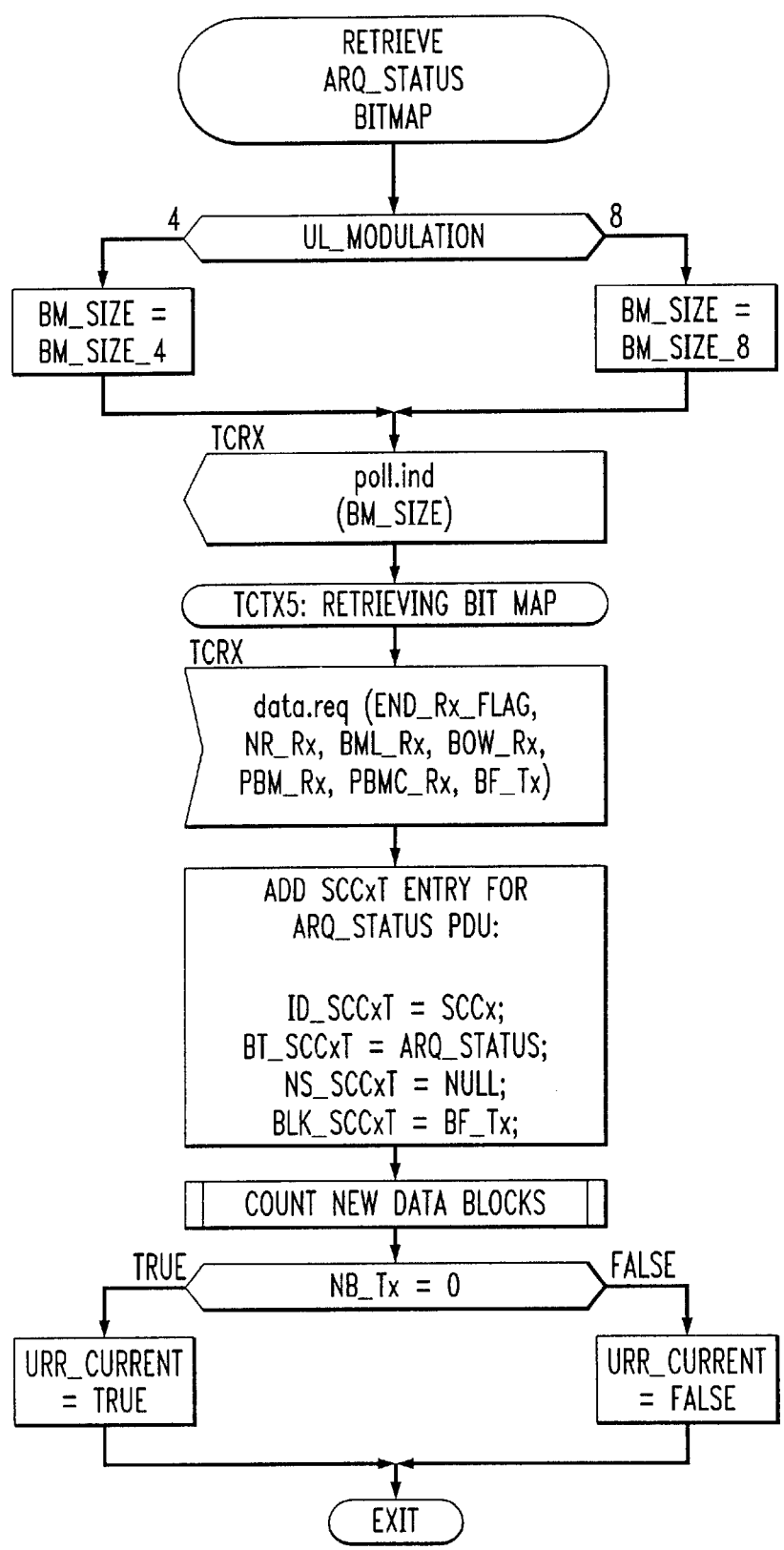

FIG. 7 shows the wait for assignment state interaction, described in FIG. 6, of the transmit controller 192, FIG. 4, with the CAM 180, FIG. 3, and PENC1. FIG. 7 also describes both a count new data blocks process and a retrieve ARQ status bitmap process. The count new data block process is preferably executed every time the TCTX 195, FIG. 4, has to determine the amount of data in the MAC buffer, FIG. 3, that has preferably never been sent over the air but still may selectively be included in the current transaction. The retrieve ARQ status bitmap process involves communicating with the receive controller (TCRX) 200, FIG. 4, to retrieve a bitmap indicating the state of the ARQ protocol for the downlink transaction.

The transmit controller 192 receives poll.ind( ) primitives from the CAM 180, FIG. 3, when a transmission opportunity on the uplink occurs. The transmit controller 192, FIG. 4, responds with the poll.res( ) primitive indicating that the transmit controller 192 may selectively send data. In the wait for assignment state, the TCTX 195 may selectively send ARQ STATUS PDUs (if polled for it by peer transmission controller 192). If CAM 180, FIG. 3, provides a transmission opportunity to this TCTX 195, FIG. 4, the CAM 180, FIG. 3, sends a poll.con( ) primitive. The TCTX 195, FIG. 4, retrieves ARQ status bitmap, constructs a PDU, and passes the PDU to the PDU encoder via a data.req( ). When counting new data blocks, the TCTX 195, FIG. 4, first checks if it has already committed to the end of current transaction (End_Tx_Flag=True). If this is the case, the TCTX 195 counts only the blocks remaining until the end of current transaction (indicated by BST_Status) and ignores data that might have arrived to the buffer (TXB0 or TXB1, FIG. 3) after transaction end had been committed to. If not, the TCTX 195, FIG. 4, counts all data in MAC buffers, TXB0 or TXB1, FIG. 3, (indicated by the sum of BST_Status and TXB_Status). If the number of new blocks counted in such a way is larger than NB_Max, the transaction may selectively continue as unbounded. Otherwise the end procedure is required.

Figure 8A:
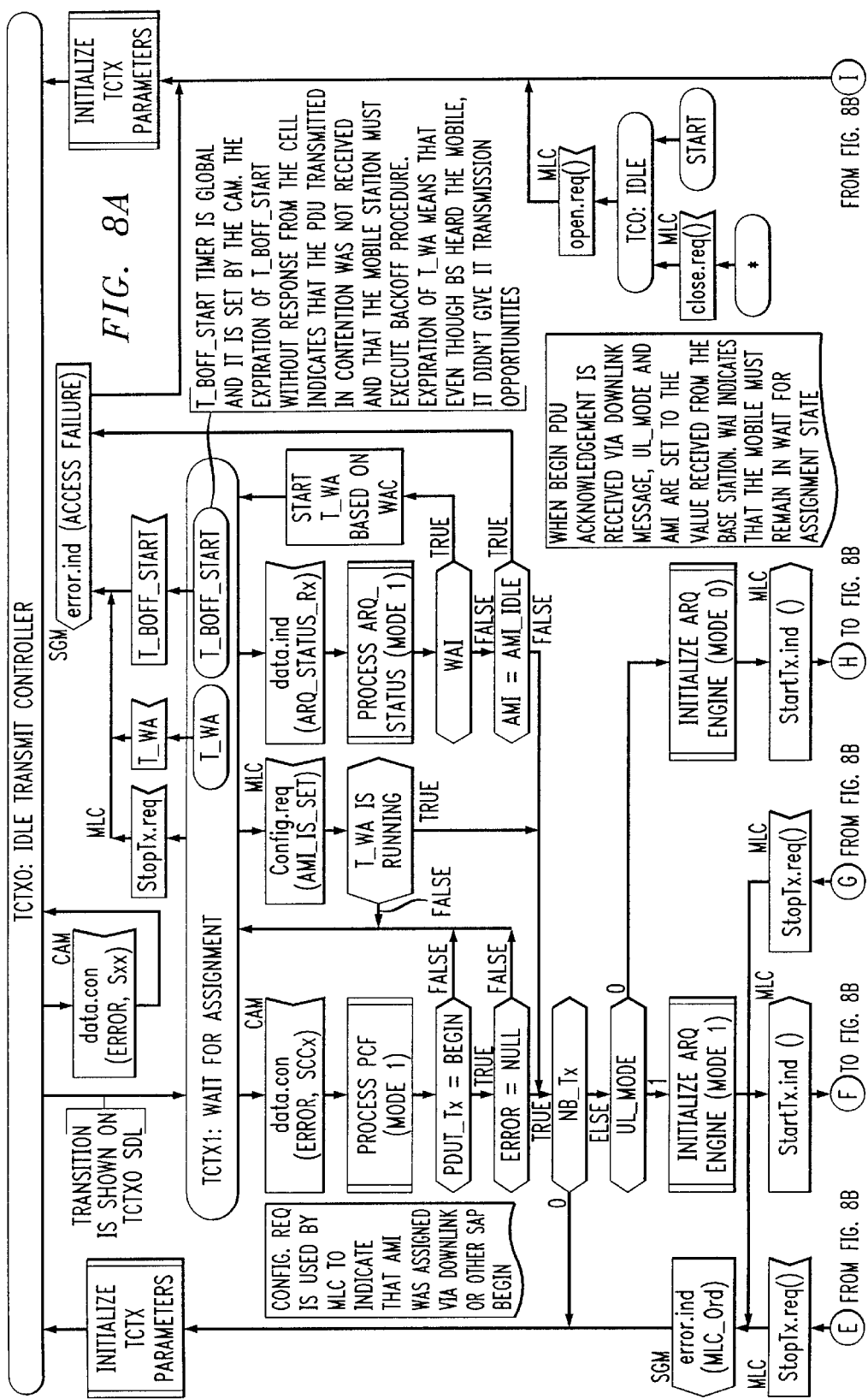
FIG. 8 is a state diagram describing another part of the transmit controller process of the mobile station transmission controller described in FIG. 4.
Figure 8B:
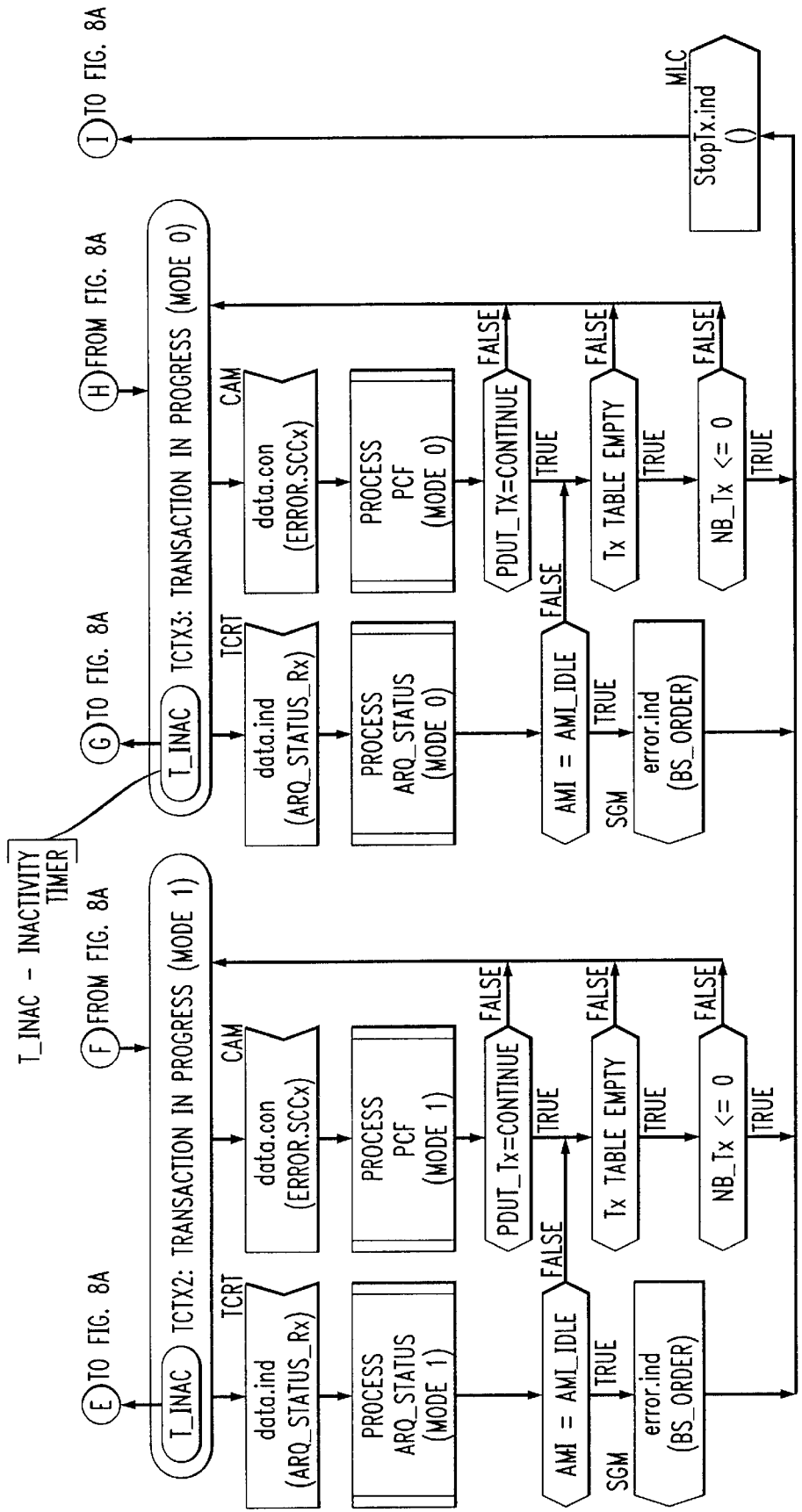

FIG. 8 illustrates transitions between the idle, wait for assignment and transaction in progress in mode 0 and mode 1 states. The TCTX 195, FIG. 4, may selectively transition from the wait for assignment state to one of the transaction in progress states (depending on uplink mode (UL_Mode) negotiated with the base station) after receiving positive acknowledgment to its BEGIN PDU via a PCF (as indicated by data.con( ) primitive from the CAM and Error=Null condition being True) or after receiving the downlink ARQ status PDU with AMI assignment (as indicated by data.ind (ARQ_Status_Rx) primitive from TCRT 200 and conditions of WAI and AMI=AMI_Idle being False). In the wait for assignment state timers T_WA and T_BOFF_START may selectively expire and the TCTX 195 may selectively transition back to the idle states. These timers designate the amount of time the mobile station should wait for the AMI/Mode assignment via ARQ Status PDU before the mobile station is allowed to repeat its access attempt.

In the transaction in progress (mode 0 and mode 1) states, the TCTX 195 may selectively receive acknowledgments via a PCF (data.con( ) from CAM 180, FIG. 3) and via ARQ Status PDU (data.ind( ) from TCRT 200, FIG. 4). If the transmit table 230, FIG. 12, is empty and there is no new data (no data backlog) to send (NB_Tx<=0), the transaction is completed and the TCTX 195, FIG. 4, selectively transitions to the idle state. Otherwise, the TCTX 195 remains in the transaction in progress states, unless the inactivity timer (T_INAC) expires.

Figure 9:
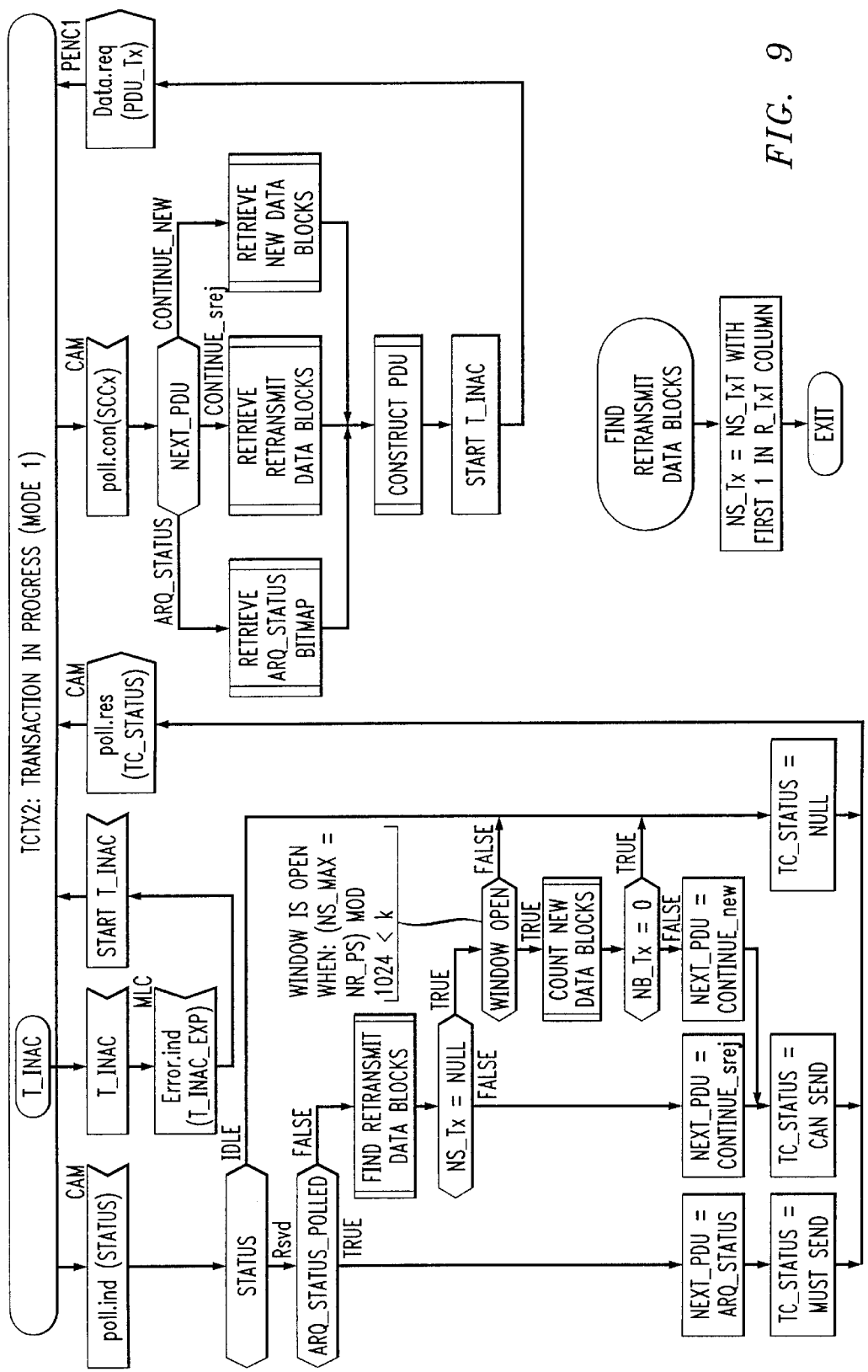
FIG. 9 is a state diagram describing another part of the transmit controller process of the mobile station transmission controller described in FIG. 4.

FIG. 9 describes the transaction in progress state, describe in FIG. 8, interaction of the transmit controller 192, FIG. 4, with the CAM 180, FIG. 3, and the PDU encoder (PENC0 or PENC1, FIG. 3). FIG. 9 also describes the find retransmit data blocks process. This process is executed selectively every time the TCTX 195, FIG. 4, determines if there are any data blocks in the transmit table 230, FIG. 12, that have not been acknowledged by the receiver and are retransmitable i.e. there is a data backlog.

The transmit controller 192 receives a poll.ind( ) primitives from the CAM 180, FIG. 3, when a transmission opportunity on the uplink occurs. The transmit controller 192 responds with the poll.res( ) primitive indicating whether it can or must send data. In the transaction in progress state the TCTX 195, FIG. 4, may selectively send ARQ STATUS (if polled for it by peer transmission controller) or CONTINUE PDUs. If the CAM 180, FIG. 3, decides to provide a transmission opportunity to this TCTX 195, FIG. 4, the CAM 180, FIG. 3, sends a poll.con( ) primitive. The TCTX 195, FIG. 4, constructs a PDU, and passes it to the PDU encoder via data.req( ).

Figure 10:
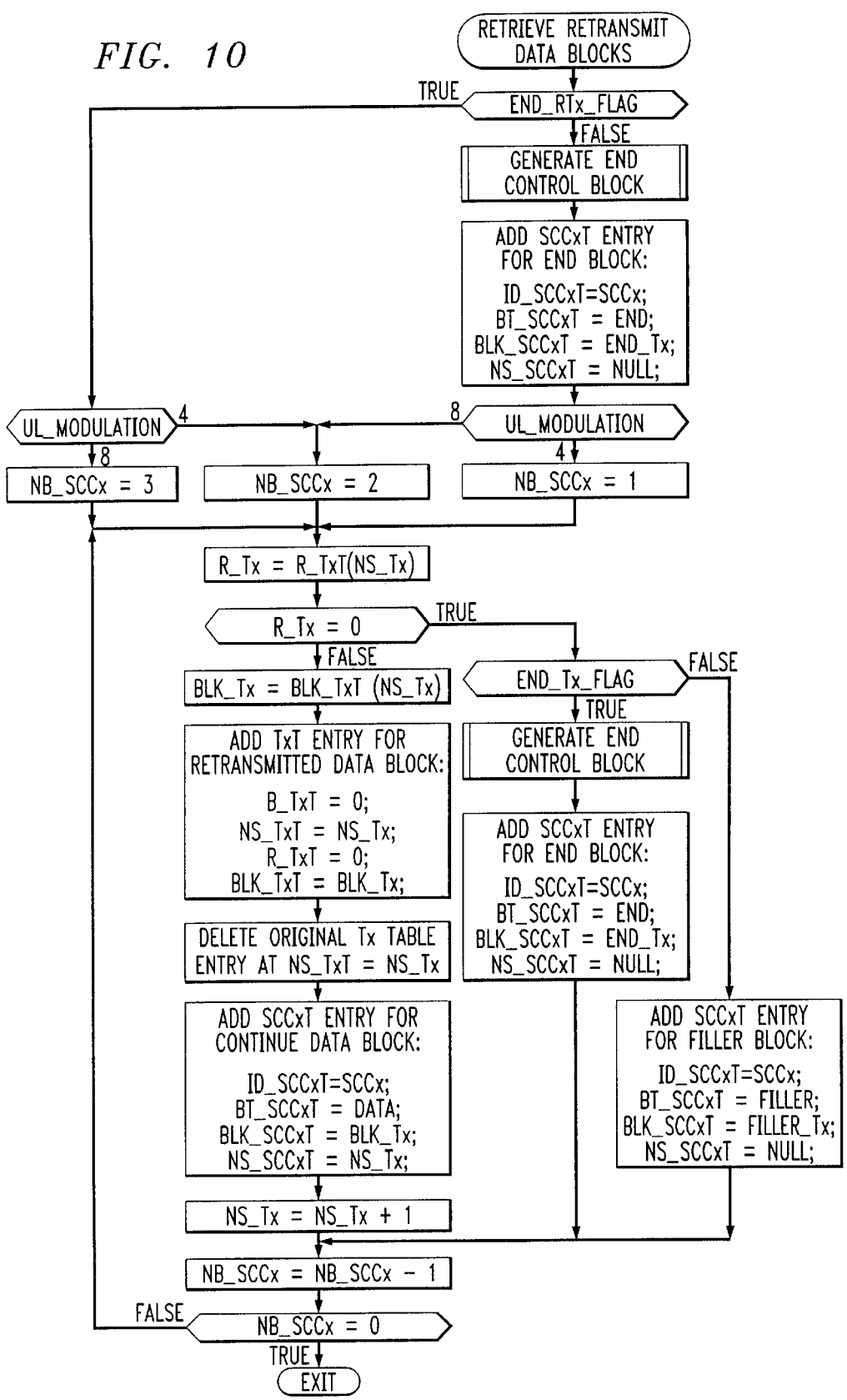
FIG. 10 is a state diagram describing a retrieve retransmit data blocks process performed by the transmit controller (TCTX) block of FIG. 4.

FIG. 10 describes a retrieve retransmit data blocks process. The process is executed by the TCTX 195, FIG. 4, every time TCTX 195 constructs the CONTINUE PDU which includes data blocks that have been transmitted previously but must be retransmitted again because the receiver failed to decode them properly (i.e. another type of data backlog). The number of such data blocks depends upon the current modulation (as examples 3 blocks for 8-level modulation and 2 blocks for 4 level) and on whether the previously transmitted End block has to be retransmitted to inform the receiver about the last sequence number it should expect for the transaction. If the End block has to be retransmitted (End_RTx_Flag=False), the process generates the End block and places it in the SCCxT table 235, FIG. 12. If after retrieving the retransmit data blocks there is still a space remaining in the PDU, the process fills this space with either the redundant End block (if the end procedure is in progress, i.e. End_Tx_Flag=True) or with the filler block (if the end procedure has not yet been started, i.e. End_Tx_Flag=False).

Figure 11B:
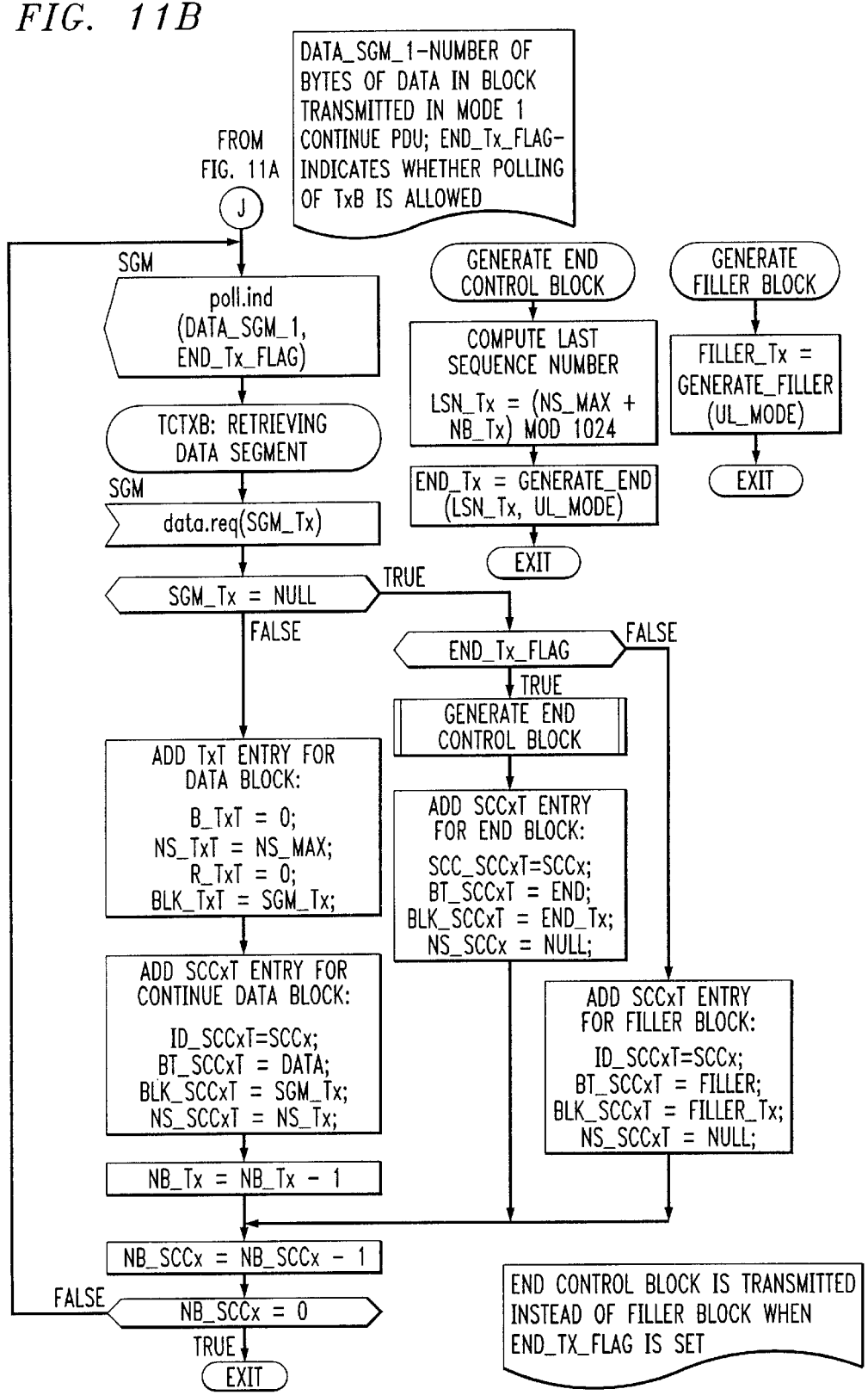
FIG. 11 is a state diagram illustrating a retrieve new data blocks process performed by the transmit controller (TCTX) block of FIG. 4.

FIG. 11 illustrates a retrieve new data blocks process. This process is executed by the TCTX 195, FIG. 4, every time the TCTX 195 constructs the CONTINUE PDU which includes data blocks that has never been transmitted previously (another type of data backlog). The number of such data blocks depends upon the current modulation (as examples 3 blocks for 8-level modulation, 2 blocks for 4 level) and on whether the End block has to be transmitted to inform the receiver about the last sequence number it should expect for the transaction. If the previously transmitted End block has to be retransmitted again (End_RTx_Flag=False) or if the number of new data blocks in MAC buffers (TXB0 and TXB1, FIG. 3) is smaller than a predefined threshold (NB_Tx<NB_Max), the process generates the End block and places it in the SCCxT table 235, FIG. 12. If after retrieving new data blocks there is still a space remaining in the PDU, the process fills this space up with either the redundant End block (if the end procedure is in progress, i.e. End_Tx_Flag=True) or with the filler block (if the end procedure has not yet been started, i.e. End_Tx_Flag=False).

FIG. 12 describes a construct PDU process 225, a transmit (TxT) table 230, and a sub-channel controllers transmit (SCCxT) table 235 used by the TCTX 195, FIG. 4. The construct PDU process 225 illustrates how various control and data fields in the PDUs are filled up with values and data. The TxT table 230, FIG. 12, is used to track ARQ state of the transmit controller 192, FIG. 4, i.e. the status and order of the previously transmitted data blocks within the transmit window. The SCCxT table 235 is used to track the association between blocks and the PDUs and the sub-channels that the PDUs have been transmitted on. The SCCxT table 235 stores information on all MAC blocks in transit that have not yet been acknowledged via a physical control field (PCF). The SCCxT table 235 is also used to facilitate construction of PDUs. Both the TxT 230 and SCCxT 235 tables are means to determine a data backlog with the MAC layer.

Figure 13:
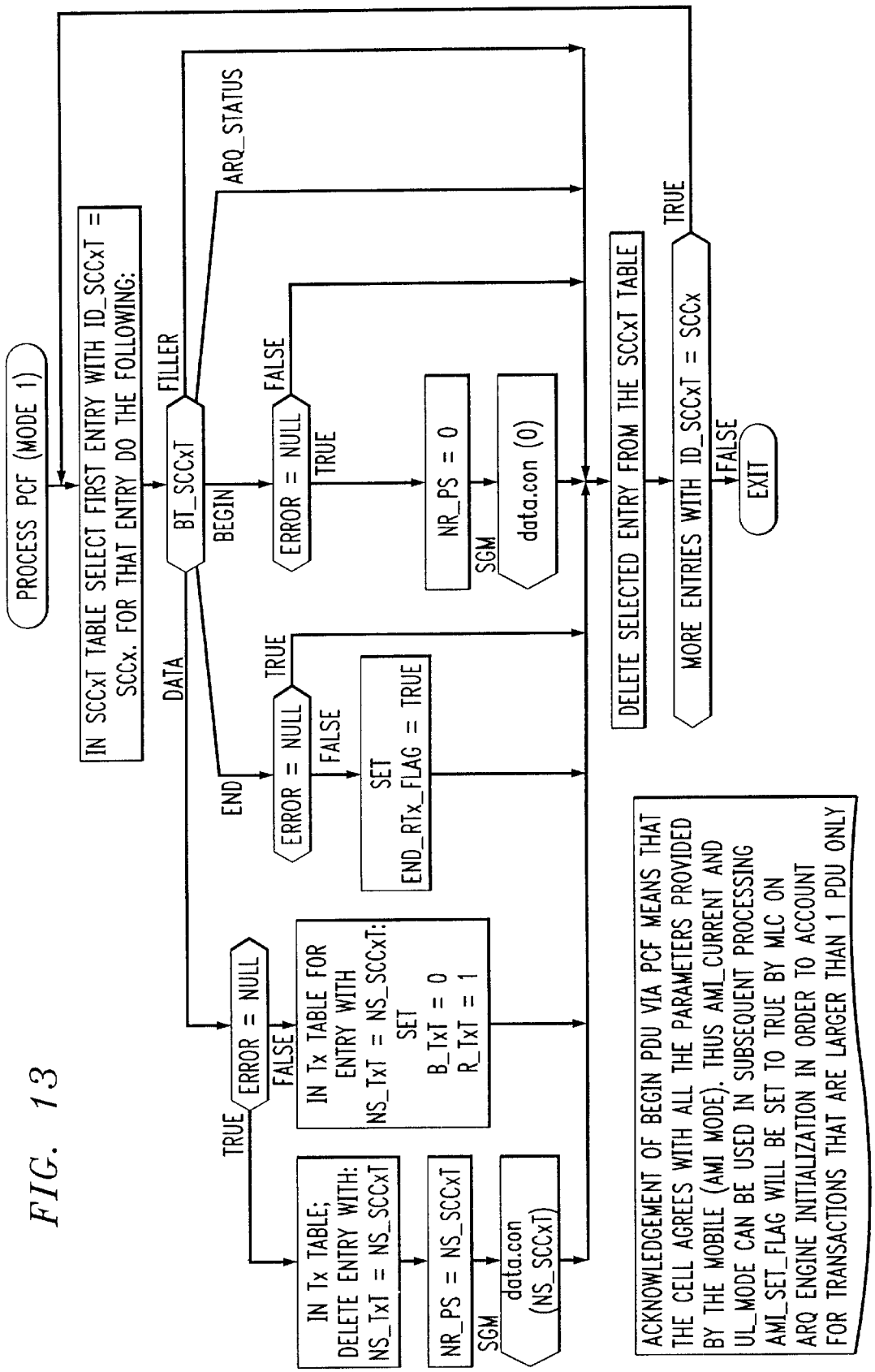
FIG. 13 illustrates a physical control field (PCF) process that is executed by the mobile station transmission controller described in FIG. 4.

FIG. 13 shows a PCF process that is executed as part of the mobile station transmit controller 192, FIG. 4. The PCF provides acknowledgment for all blocks transmitted in the previous uplink burst on the sub-channel. If the PCF indicates that the previous uplink transmission on the sub-channel was received, a transmit table corresponding to the blocks transmitted is updated. The ARQ state variables at the TC 192 are also updated to reflect the PCF acknowledgment. The TC 192 provides a data.con signal to the segmenter (SGM0 or SGM1, FIG. 3) for each block acknowledged. If the data blocks transmitted in the previous uplink burst on the sub-channel are negatively acknowledged via the PCF, then the data blocks are marked as retransmittable.

Figure 14:
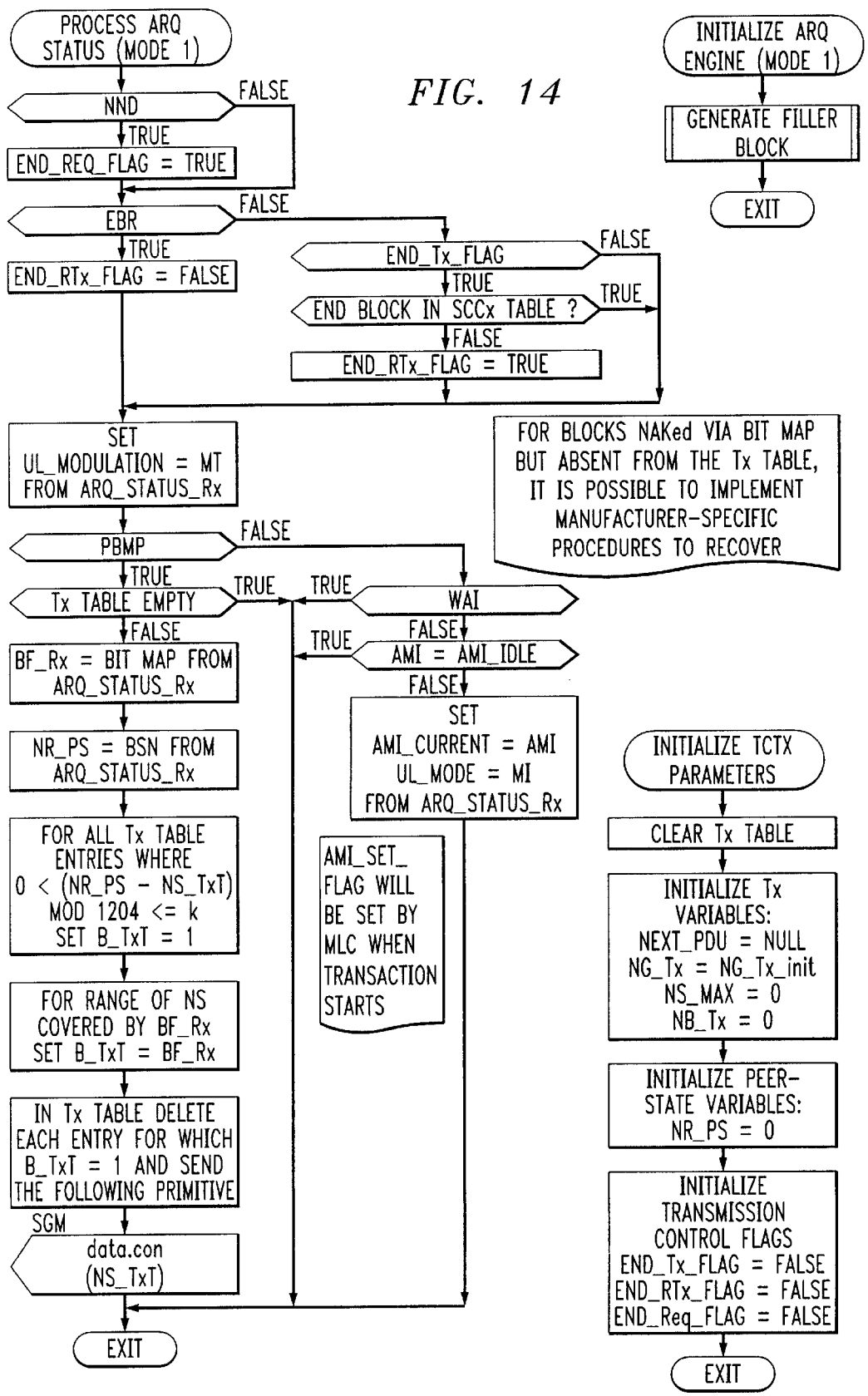
FIG. 14 illustrates an automatic retransmission request (ARQ) status process that is executed by the mobile station transmission controller described in FIG. 4.

FIG. 14 illustrates an ARQ status process that is executed selectively by the mobile station transmit controller 192, FIG. 4. An ARQ Status PDU may be used to assign an AMI and mode to the mobile station if the AMI and/or mode proposed by the mobile station are unacceptable. Alternatively, it may indicate that the mobile station must wait for a subsequent AMI and/or mode assignment. This process also causes an update of the ARQ state variables and transmit table (TxT 230, FIG. 12) at the TC 192. If a NND field in the ARQ Status PDU is set, then the mobile station assumes that no new Layer 3 data may be transmitted. If an End block was transmitted while nearing the end of the transaction, then the End block is acknowledged through an EBR bit in the ARQ Status PDU. If the ARQ status PDU includes a primary bitmap indicating the receipt status of all blocks within the receive window, then this bitmap is used to update the receipt and retransmittability status of blocks within the transmit table (i.e., the transmit controller understands the receive window). For each block acknowledged by the bitmap, the TC 192 provides a data.con signal to the segmenter.

Figure 15:
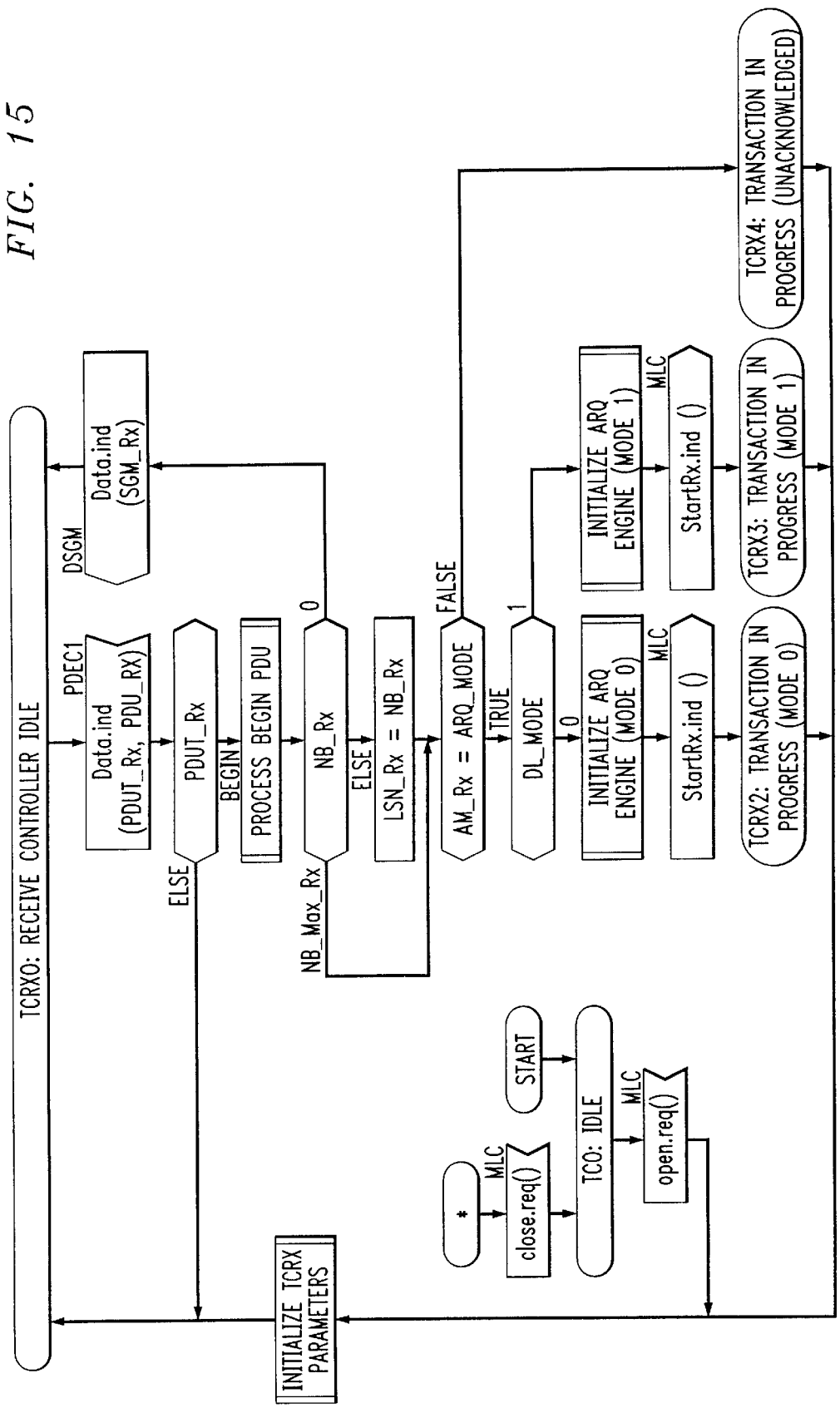
FIG. 15 is a state diagram illustrating a mobile station receive controller process preformed by the receiver controller block of FIG. 4 in the context of transaction initiation.

FIG. 15 shows the mobile station receive controller process in the context of transaction initiation. FIG. 15 illustrates signals obtained by the receive controller (TCRX) 200, FIG. 4, from the PDU decoder, PDEC0 or PDEC1, FIG. 3 (in state Data.ind). Also shown are signals sent by the TCRX 200, FIG. 4, process to a desegmenter, DSGM0 or DSGM1, FIG. 3 (in state Data.ind) and MLC 190 in state StartRx.ind.

BEGIN PDUs are selectively received while the TCRX 200, FIG. 4, is in the idle state. On receiving a BEGIN PDU from the PDU decoder, PDEC0 or PDEC1, FIG. 3, the TCRX 200, FIG. 4 determines whether the transaction is acknowledged and whether the transaction is bounded (i.e., limited to the transfer of NB_Rx Data blocks). For ARQ transactions, the TCRX 200 also determines the ARQ mode (mode 0 or mode 1) for the transaction and initializes an ARQ engine (also known as a TC 192, FIG. 4) in the indicated mode. The TCRX 200, FIG. 3, is an example means for initiating a MAC transaction in response to a BEGIN frame.

Figure 16:
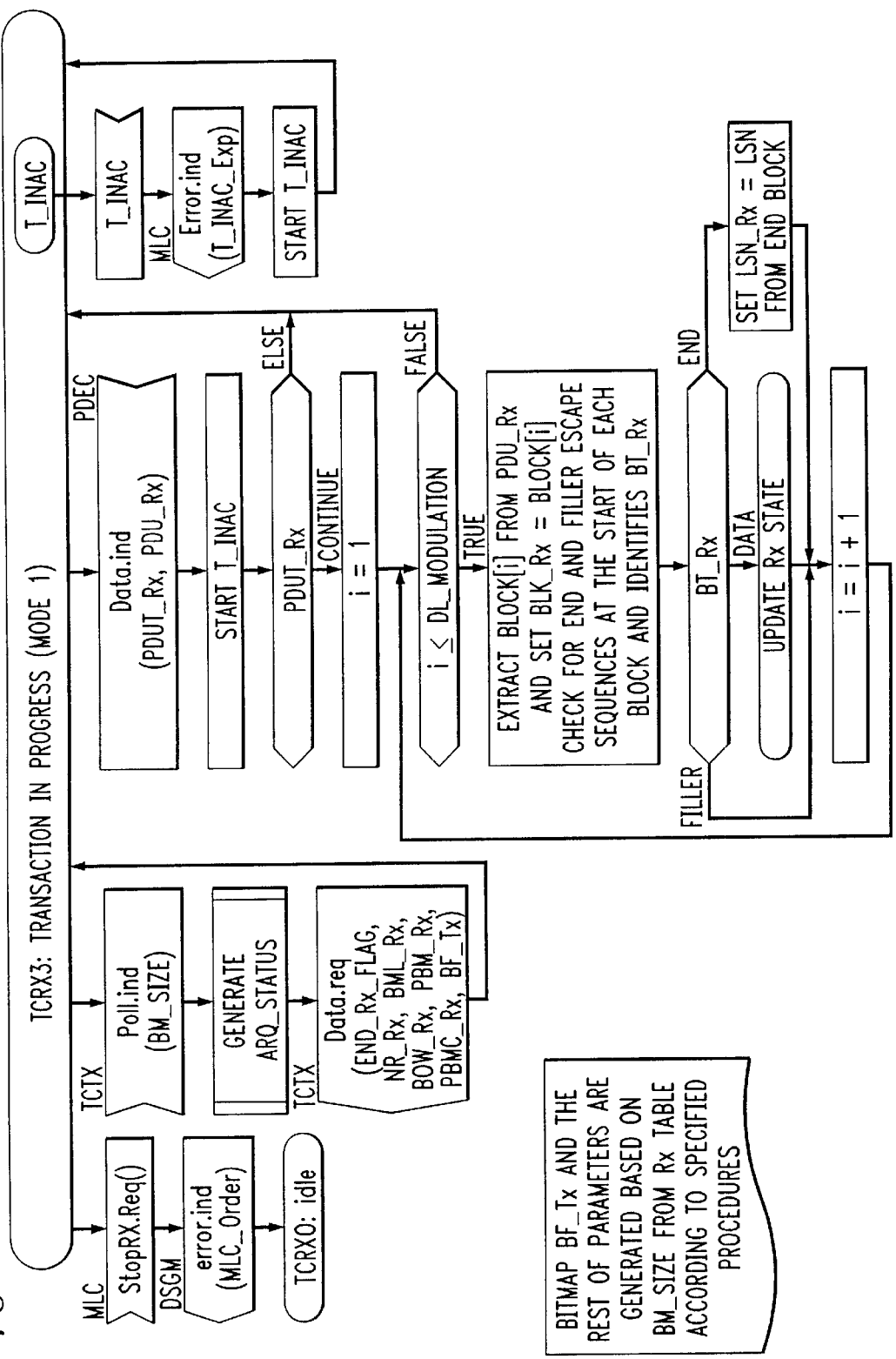
FIG. 16 is a state diagram illustrating a mobile station receive controller process preformed by the receiver controller block of FIG. 4 while a fixed coding mode ARQ transaction is in progress.

FIG. 16 illustrates the mobile station receive controller process while a fixed coding mode ARQ transaction is in progress. FIG. 16 shows signals received by the TCRX 200, FIG. 4, from the TCTX 195 (in state Poll.ind), MLC 190, FIG. 3, (in state StopRx.Req) and the PDU Decoder, PDEC0 or PDEC1, FIG. 3 (in state Data.ind). Also shown in FIG. 16 are signals sent by the TCRX 200, FIG. 4, to the TCTX 195 (the state Data.req), desegmenter, DSGM0 or DSGM 1, FIG. 3 (in state error.ind), and MLC 190, FIG. 3 (in state Error.ind).

On being polled by a TC 192, FIG. 4, for ARQ Status, the TCRX 200 generates an ARQ status PDU (which contains a bitmap indicating the receipt status of all blocks in a receive window) and provides it to the TC 192. The CONTINUE PDUs are selectively received while a transaction is in progress. On receiving a CONTINUE PDU from the PDU decoder, the TCRX 200 extracts multiple blocks from the PDU. It is appreciated that the number of blocks extracted depends on the downlink modulation. The blocks are selectively of type end, data or filler. End and filler blocks are identified by escape sequences at the start of the block. If an end block is received, the TCRX 200 preferably sets the last valid sequence number for the transaction to the sequence number indicated by the end block. For each data block extracted, the TCRX 200 executes a update receive (Rx) state process.

Figure 17:
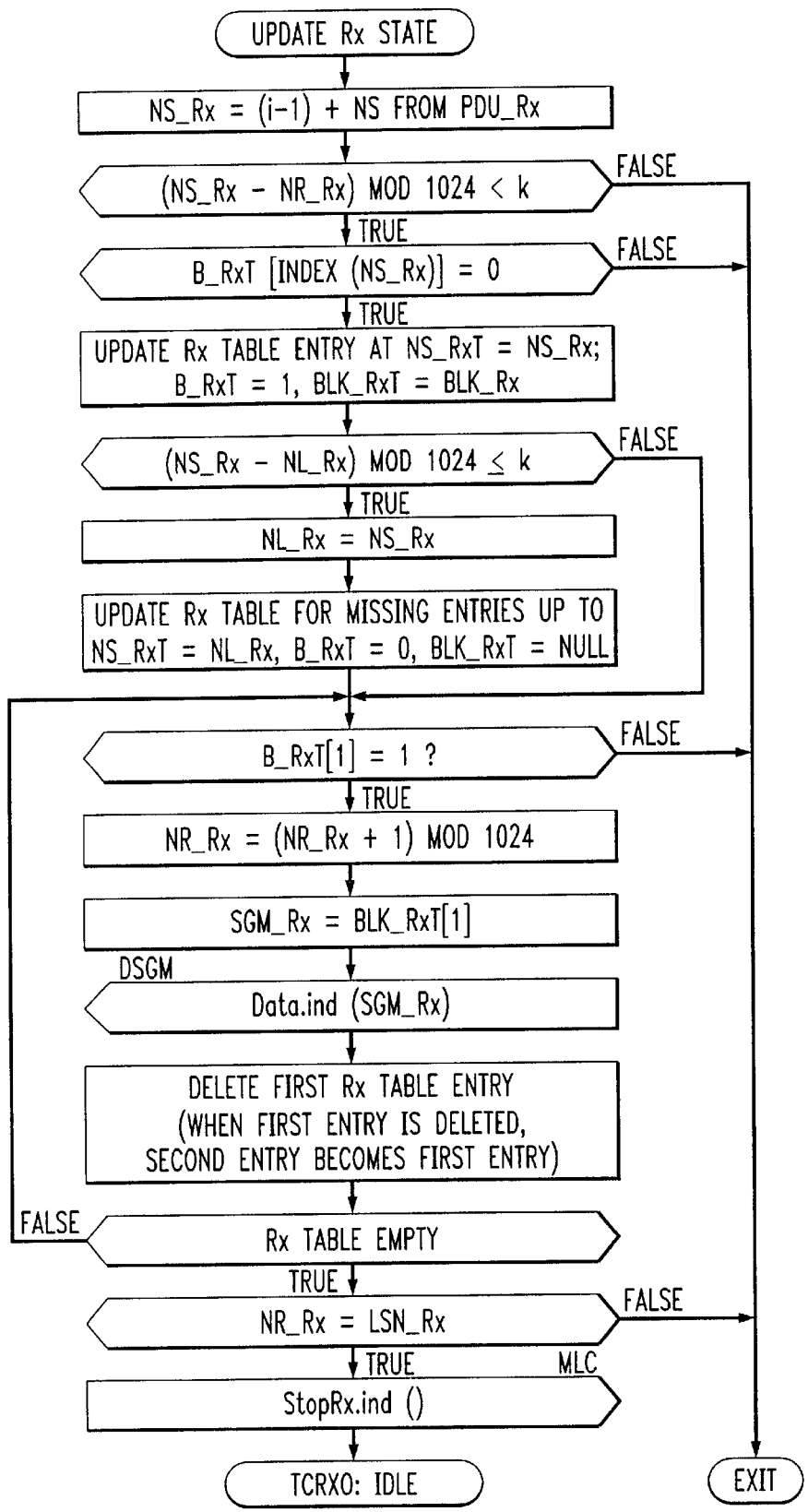
FIG. 17 is a state diagram illustrating an update receive (Rx) state executed by the receive controller block of FIG. 4 when a data block is received.

FIG. 17 shows the update Rx state process executed by the TCRX 200, FIG. 4, when a data block is received. FIG. 17 shows signals sent by the receive controller 200 to the desegmenter, DSGM0 or DSGM1, FIG. 3 (in state Data.ind) and MLC 190, FIG. 3 in state StopRx.ind.

The receive controller 200, FIG. 4, selectively invalidates and discards the data block if it lies outside the window or corresponds to a block that was previously received. If the data block remains valid, the TCRX 200 updates the receipt status of the block. The receive controller 200 also updates the two state variables, NR_Rx (sequence number up to which all data blocks have been received in-sequence) and NL_Rx (last sequence number that was received). The receive controller 200 then delivers all data blocks that have been received in-sequence to the desegmenter and deletes these entries from a receive table. The process stops when the receive table is empty and NR_Rx is equal to the last valid sequence number for the transaction.

Figure 18:
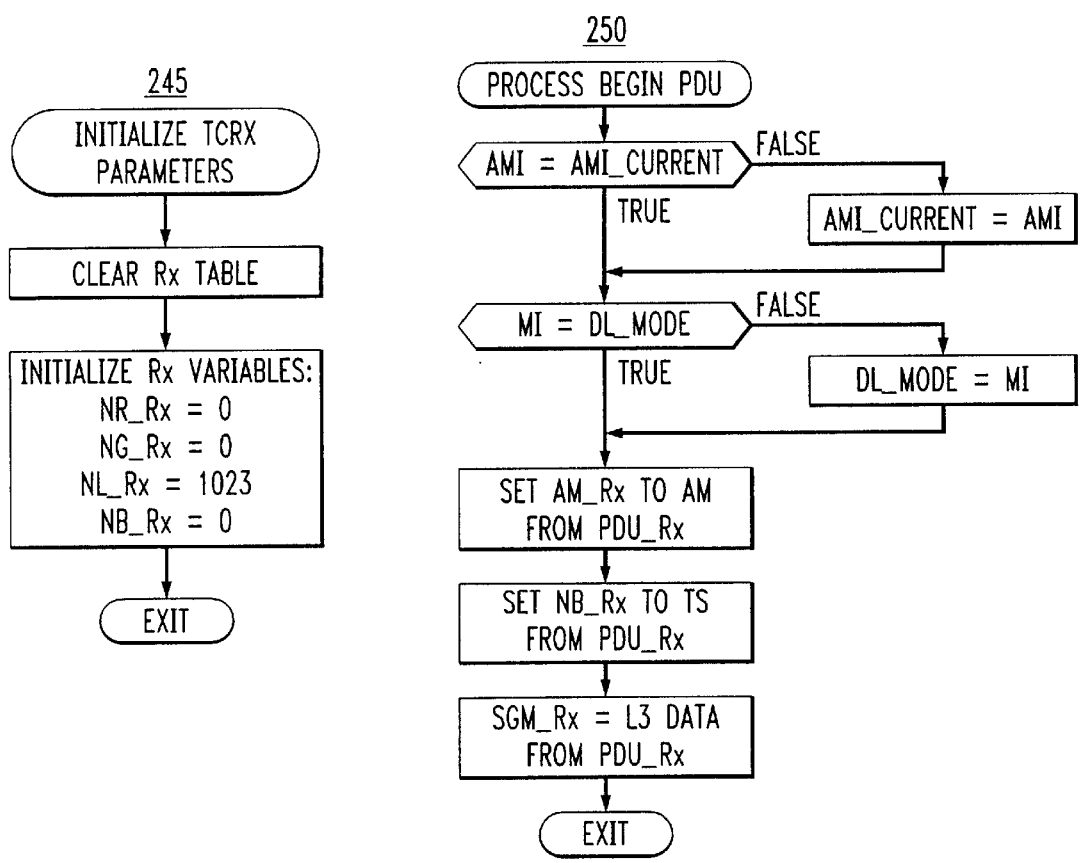
FIG. 18 is a state diagram illustrating a mobile station receive table, an initialize receive controller (TCRX) parameters process, and a BEGIN PDU process which are executed by the receive controller of FIG. 4.

FIG. 18 shows the mobile station receive table 240, an initialize TCRX 200 parameters process 245 and a BEGIN PDU process 250 which are executed by the receive controller (TCRX) 200, FIG. 4. The receive table 240 consists of the block sequence number, data block and receipt status for each sequence number within the receive window. The initialize TCRX 200 parameters process 245 carries out an initialization of the receive table 240 and other ARQ state variables. The BEGIN PDU process 250 illustrates the initialization of the AMI, mode and the size for the transaction. It is appreciated that these parameters are extracted from corresponding fields within the BEGIN PDU.

Figure 19A:
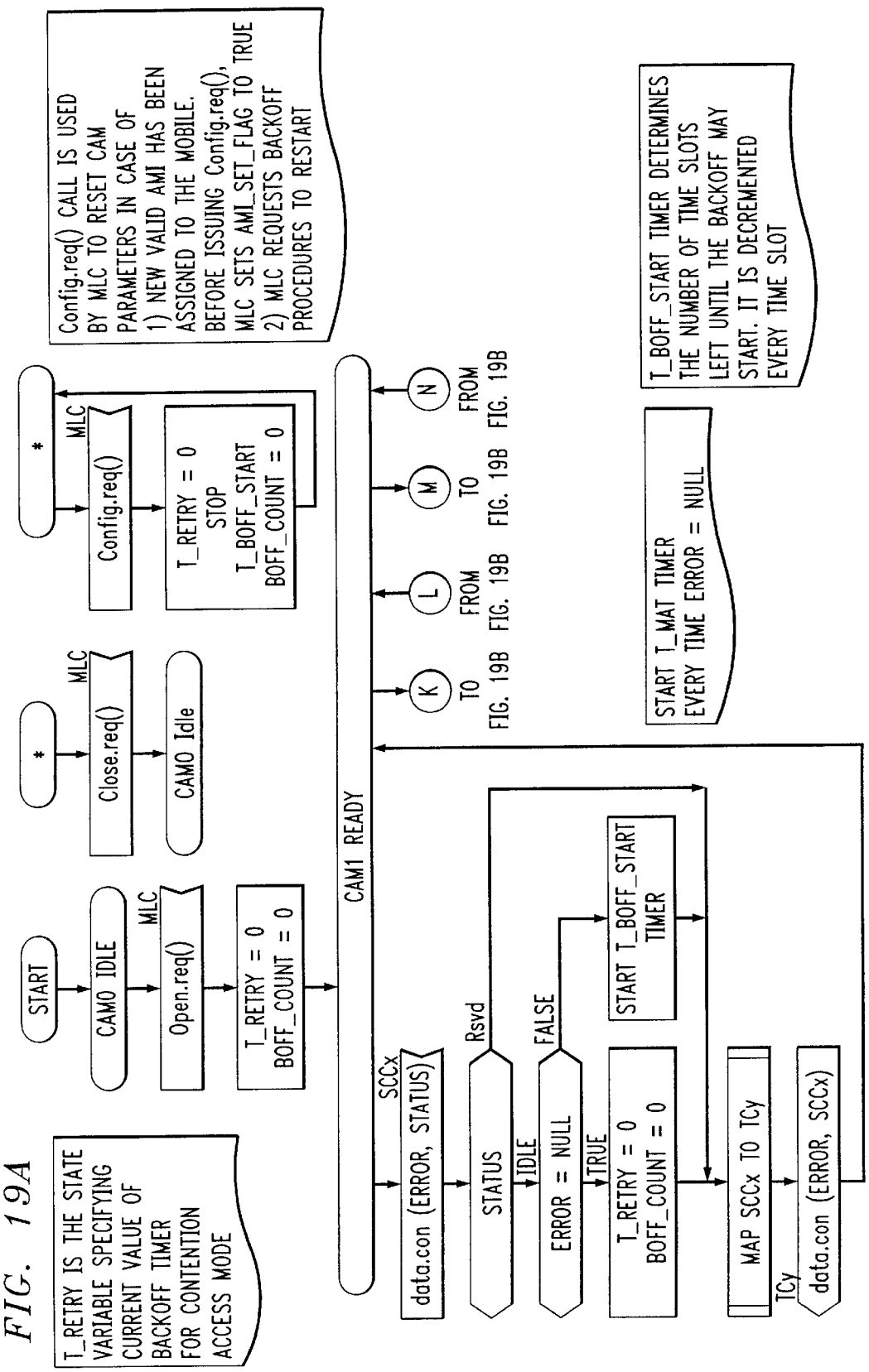
FIG. 19 is a state diagram illustrating a mobile station channel access manager (CAM) block of FIG. 3.
Figure 19B:
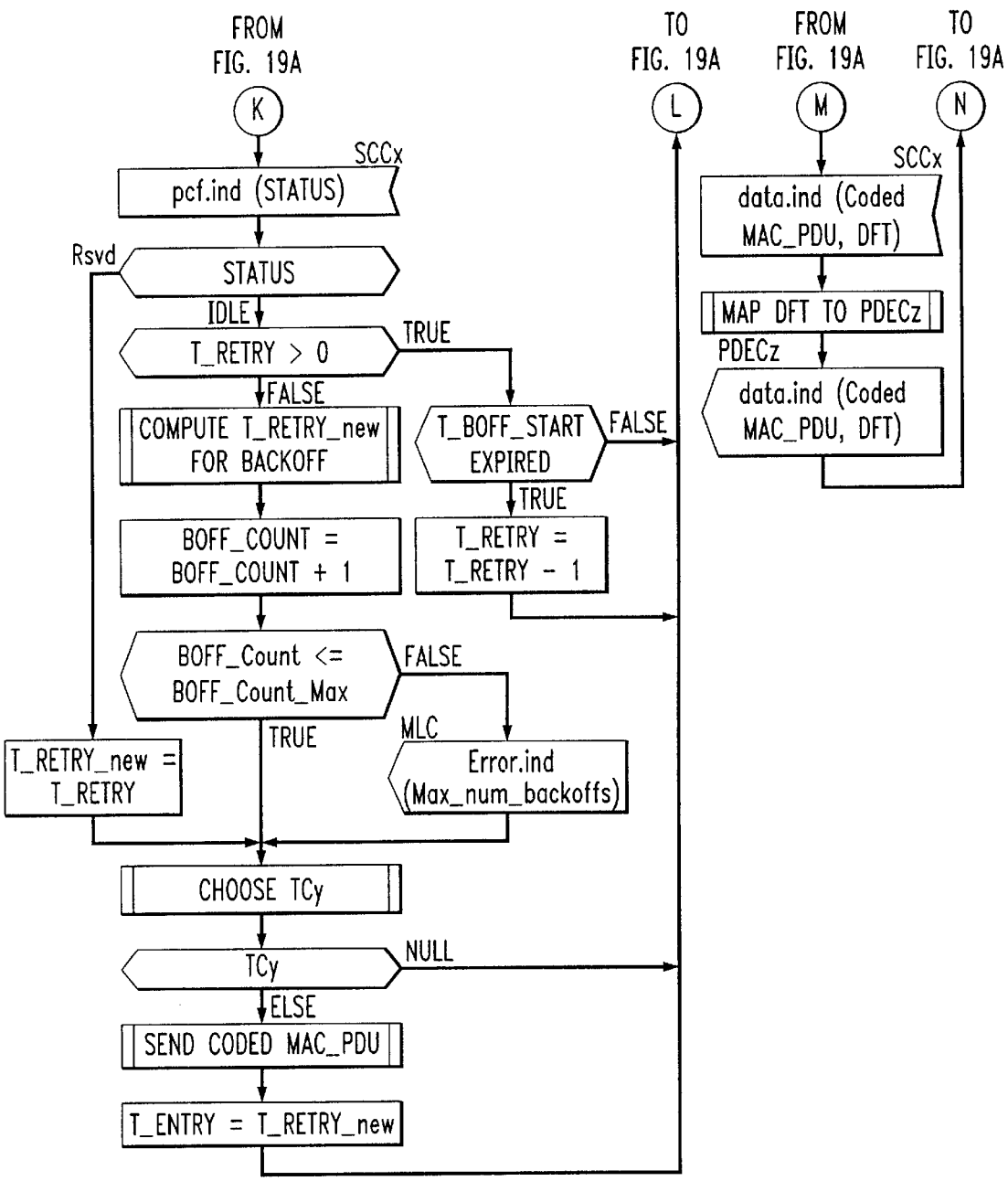

FIG. 19 shows the mobile station CAM process for the CAM 180, FIG. 3. FIG. 19 shows signals received from any one of the SCCs 185 (data.con, pcf.ind, data.ind) and the MLC 190 (Open.req, Config.req, Close.req). FIG. 19 also shows the signals sent by the CAM 180 to the transmit controller 185 (data.con), PDU decoder, PDEC0 or PDEC1, FIG. 3 (data.ind), and MLC 190 (Error.ind).

The CAM 180 determines the order of transmission for coded MAC PDUs from multiple transmit controllers 185 (SCC0 through SCC8). The CAM 180 polls the transmission controllers 185 for MAC PDUs when it is made aware of a transmission opportunity by one of the MAC sub-channel controllers 185. Based on the response to the CAM 180 polls, the CAM 180 polls one of the transmit controllers 185 for the data. The CAM 180 selectively sends coded MAC PDUs obtained from one of the PDU encoders (PENC1 and PENC0) to the appropriate SCC 185 for transmission over the air interface 175 (also known as the radio interface).

The CAM 180 is also responsible for executing a random access protocol at the mobile station. This function manages channel access in contention mode and all subsequent back-off procedures in case of the failure of initial access. After successful access, the CAM 180 polls the transmit controllers 185 and proceeds by sending PDUs in the assigned slots indicated by sub-channel controllers 185.

In the receive direction, the CAM 180 obtains MAC PDUs from the sub-channel controller 185 and passes them on to the PDU decoder corresponding to the indicated mode.

Figure 20:
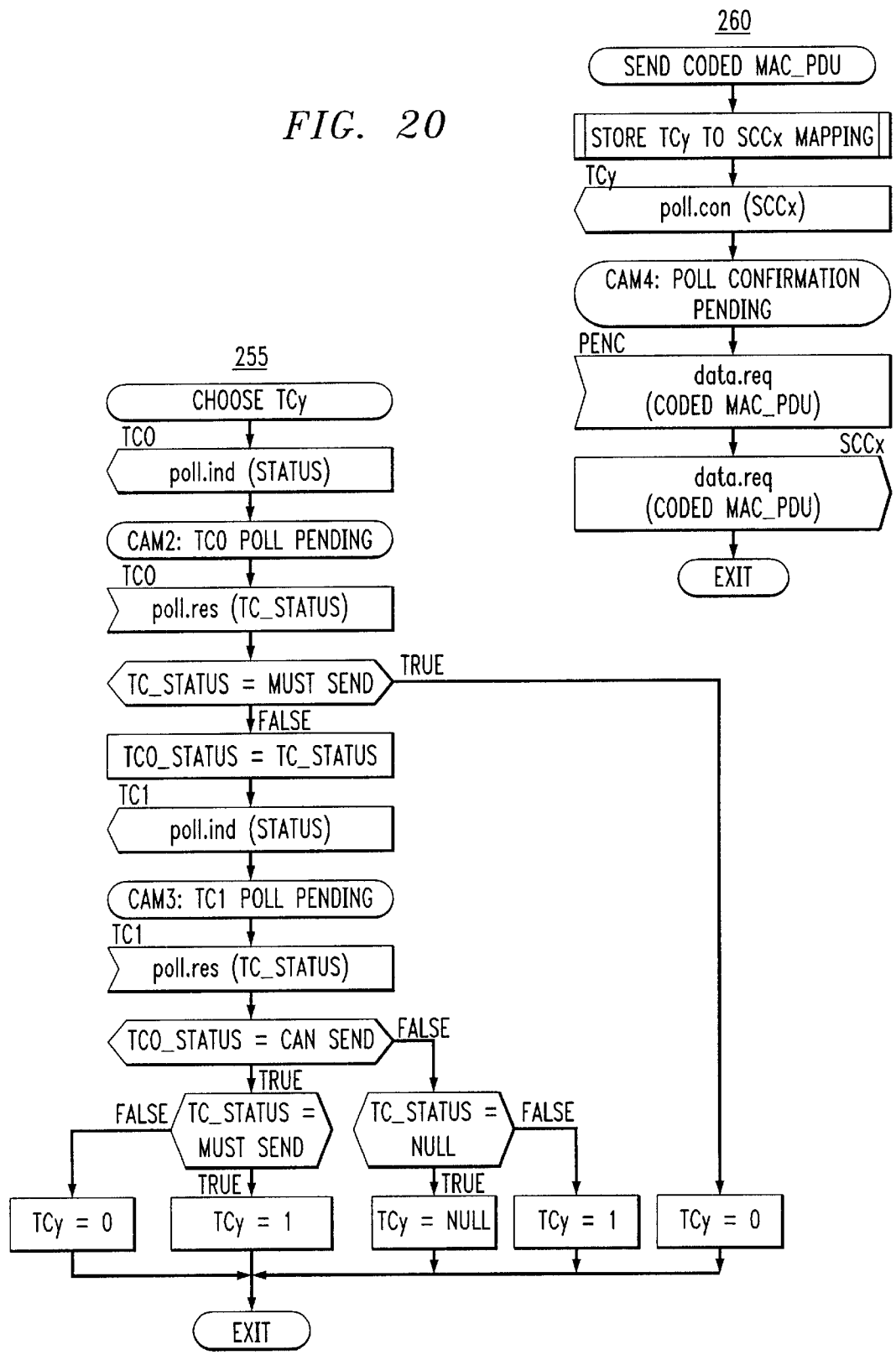
FIG. 20 is a state diagram illustrating the choose transmit controller (TCy) process and send coded MAC_PDU process which are executed by the CAM block of FIG. 3.

FIG. 20 illustrates a choose transmission controller (TCy) process 255 and a send coded MAC_PDU process 260 which are executed by the CAM 180, FIG. 3. FIG. 20 shows signals sent by the CAM 180 to the TCs (TC1 and TC2, FIG. 3, and poll.ind and poll.con, FIG. 20) and SCCs 185, FIG. 3 (data.req). FIG. 20 also shows signals received from the TCs (TC1, TC2, FIG. 3 and poll.res, FIG. 20) and the PDU encoder (PENC0 and PENC1, FIG. 3 and data.req, FIG. 20).

The CAM 180, FIG. 3, polls each transmit controller in order of priority when it is made aware of a transmission opportunity by any SCC 185. Each TC (TC0 and TC1) responds with an indication that it selectively send data, can send data or has nothing to send. Based on the response, the CAM 180 chooses the appropriate TC (TC0 and TC1) to poll for data. Subsequently, the CAM 180 obtains a coded MAC PDU from the PDU encoder (PENC0 and PENC1) that the CAM 180 provides to the appropriate SCC 185 for transmission over the air interface 175.

Figure 21B:
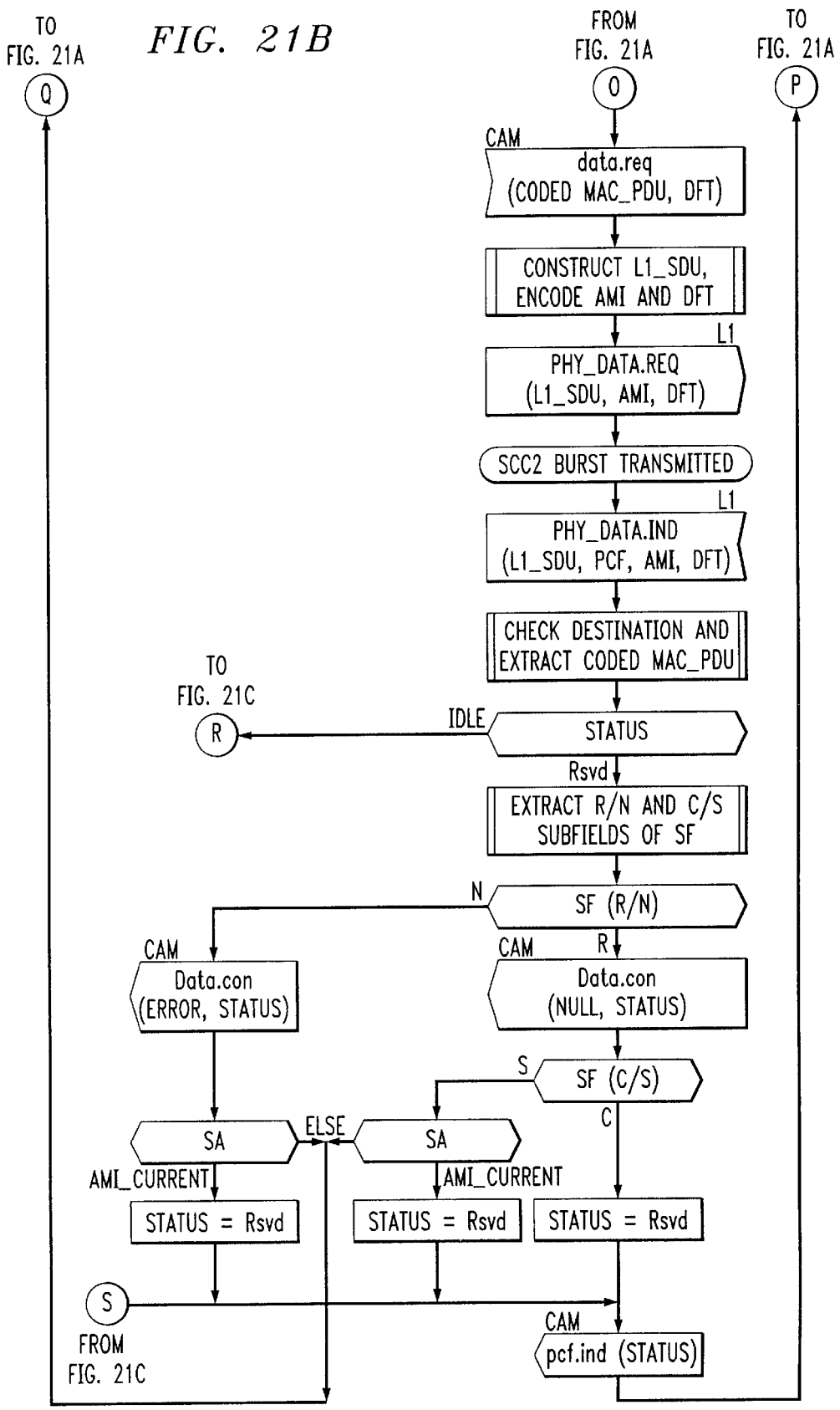
FIG. 21 is a state diagram illustrating a mobile station sub-channel controller process (SCC) block of FIG. 3.
Figure 21C:
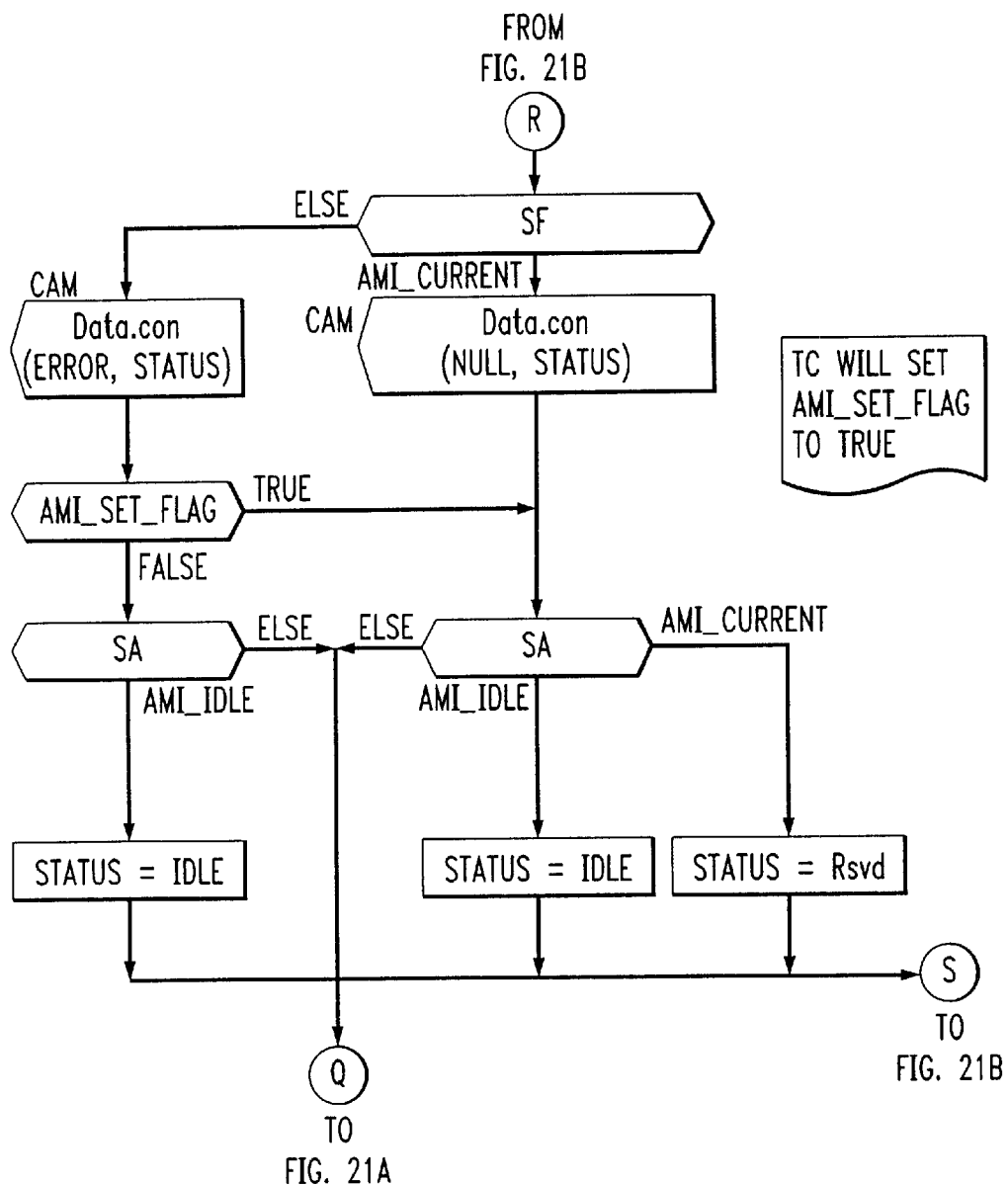

FIG. 21 illustrates the mobile station sub-channel controller (SCC) process. The MAC Layer has preferably 9 sub-channel controllers 185 (SCC0 through SCC8), FIG. 3, for a triple rate channel, 6 for a double rate channel and 3 for a full rate channel. Each sub-channel controller 185 handles a packet channel feedback (PCF) operation for the sub-channel and passes coded MAC PDUs between the CAM 180 and the physical Layer 165.

In FIG. 21, signals are received by the SCC 185, FIG. 3, from the physical Layer 165 (PHY_DATA.IND), CAM 180 (Data.req) and MLC 190 (Open.req, Close.req). Additionally the signals sent by the SCC 185 to the CAM 180 (pcf.ind, Data.con) and the physical layer 165 (PHY_DATA.REQ) are shown.

On obtaining data from the physical layer 165, the SCC 185 checks the AMI to determine if the mobile station is the intended recipient. If the data is not intended for the mobile station, it is discarded; otherwise the coded MAC PDU is passed on to the CAM 180. The SCC 185 also obtains contention and reserved access opportunities via the PCF and polls the CAM 180 for data. Any coded MAC PDU subsequently obtained from the CAM 180 is then passed on to the physical layer 165. After the PDU is transmitted, the SCC 185 checks the corresponding PCF field on the sub-channel in order to determine if the PDU was received successfully. The SCC 185 assumes a different PCF structure depending on whether data was transmitted using contention or reservation. The acknowledgment status obtained via PCF is indicated to the CAM 180.

Figure 22:
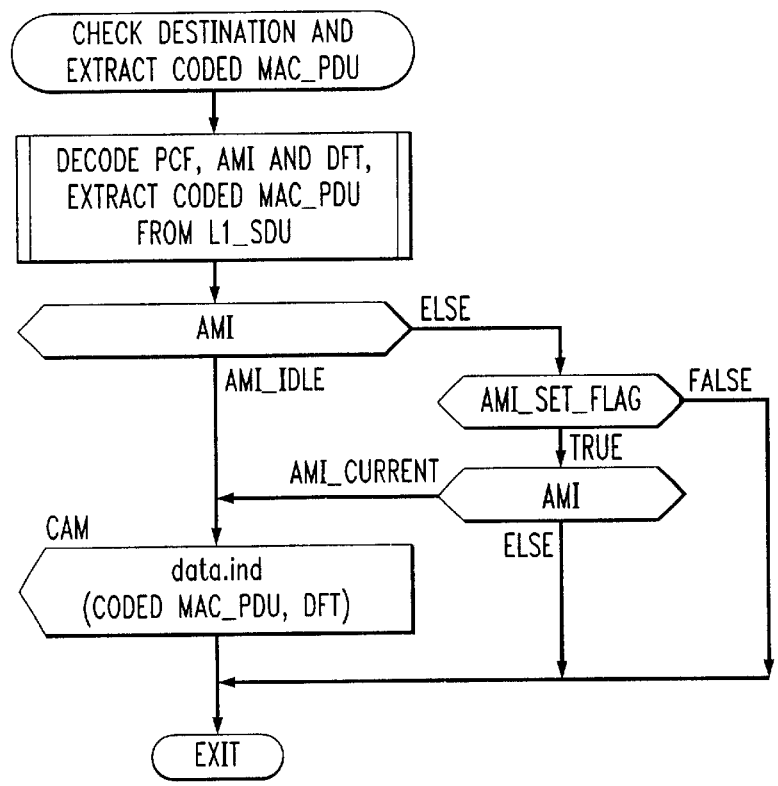
FIG. 22 is a state diagram illustrating a check destination and extract coded MAC_PDU process that is executed by the SCC block of FIG. 3 on obtaining data from the physical layer of FIG. 3.

FIG. 22 illustrates a check destination and extract coded MAC_PDU process that is executed by the SCC 185, FIG. 3, process on obtaining data from the physical layer 165. The SCC 185 may selectively send a data.ind signal to the CAM 180 as part of this process. On obtaining data from the physical layer 165, the SCC 185 checks the AMI to determine if the mobile station is the intended recipient. If the data is not intended for the mobile station, it is discarded; otherwise the coded MAC PDU is passed on to the CAM 180.

Figure 23:
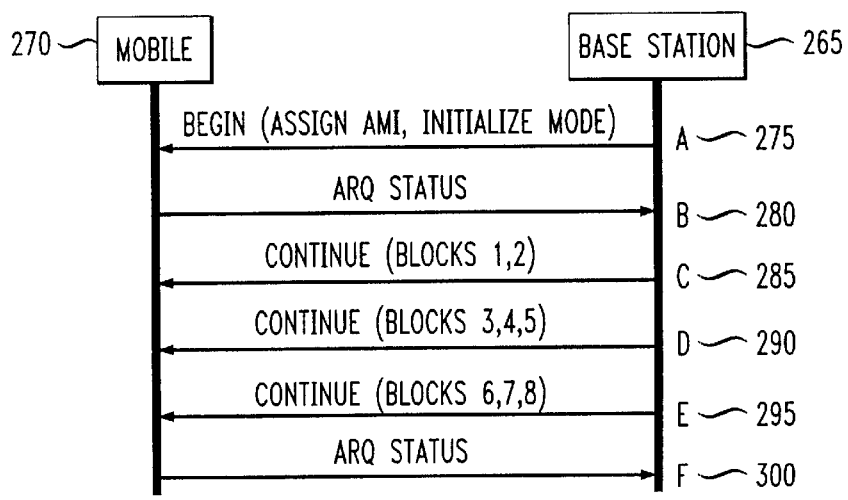
FIG. 23 shows a signal flow diagram for an END procedure for a bounded transaction.

FIG. 23 shows a signal flow diagram for an END procedure for a bounded transaction between a base station (cell) 265 and a mobile 270. In step 275, the base station 265 sends a BEGIN frame indicating that the transaction size is 8 data blocks (i.e., transaction is bounded) and polls the mobile station 270 for ARQ Status. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210, FIG. 4 receives the data from CAM 180, FIG. 3, extracts a poll bit (PI), sets ARQ_Status_polled flag=PI and passes the BEGIN PDU to the TCRX 200, FIG. 4 (described in the FIG. 15). The TCRX 200, FIG. 4, receives the BEGIN PDU from the TCRT 210 and sets a last valid sequence number in FIG. 15.

In step 280, the mobile station 270 acknowledges receipt of the BEGIN PDU by sending an ARQ status PDU to the base station 265 and sets the last valid sequence number for the transaction to 8. This step was shown in the state diagrams when the SCC 185, FIG. 3, detects a transmission opportunity by reading the PCF and indicates it to CAM 180, FIG. 3, in FIG. 21. The CAM 180, FIG. 3, polls the TCTXs 195 in FIGS. 19 and 20. The TCTX 195, FIG. 4, on the same step, where the Begin PDU is received, indicates to the CAM 180, FIG. 3, that it selectively sent an ARQ status PDU in FIGS. 6, 7 and 9. The CAM 180, FIG. 3, polls TCTX 195, FIG. 4, for ARQ status PDU in FIG. 19. The TCTX 195, FIG. 4, polls the TCRX 200 for an ARQ Status bitmap in FIG. 7. The TCRX 200, FIG. 4, generates ARQ status and provides it to the TCTX 195 in FIG. 7. The TCTX 195, FIG. 4, sends the ARQ status PDU to PDU encoder (PENC0 or PENC1, FIG. 3) in FIGS. 6, 7 and 9. The PDU encoder (PENC0 or PENC1, FIG. 3) encodes the PDU and sends the encoder PDU to the CAM 180. The CAM 180 passes the encoder PDU on to SCC 185 in FIG. 7. The SCC 185, FIG. 3, then provides data to the physical Layer 165 in FIG. 21.

In step 285, the base station 265 sends a CONTINUE PDU to the mobile 270 which includes the data blocks numbered 1 and 2. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210 receives the data from the CAM 180, FIG. 3 and the TCRX 200, FIG. 4, receives the CONTINUE PDU and updates the RX state in FIGS. 16 and 17.

In step 290, the base station 265 sends a CONTINUE PDU to the mobile 270 which includes the data blocks numbered 3, 4 and 5. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210 receives the data from the CAM 180, FIG. 3 and the TCRX 200, FIG. 4, receives the CONTINUE PDU and updates the RX state in FIGS. 16 and 17.

In step 295, the base station 265 sends a CONTINUE PDU to the mobile 270 which includes the data blocks numbered 6, 7 and 8, and polls the mobile station 270 for an ARQ Status. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210 receives the data from CAM 180, FIG. 3, extracts a poll bit (PI), sets an ARQ_Status_polled flag=PI and passes a CONTINUE PDU to TCRX 200, FIG. 3, in FIG. 5. The TCRX 200, FIG. 3, receives the CONTINUE PDU and updates RX state in FIGS. 16 and 17.

In step 300, the mobile station 270 sends an ARQ status to the base station 265 that acknowledges the receipt of blocks 1 to 8. This step was shown in the state diagrams when the SCC 185, FIG. 3, detects a transmission opportunity by reading the PCF and indicates it to CAM 180, FIG. 3, in FIG. 21. The CAM 180, FIG. 3, polls the TCTXs 195 in FIGS. 19 and 20. The TCTX 195, FIG. 4, on the same step, where the Begin PDU is received, indicates to the CAM 180, FIG. 3, that it selectively sent an ARQ status PDU in FIGS. 6, 7 and 9. The CAM 180, FIG. 3, polls TCTX 195, FIG. 4, for ARQ status PDU in FIG. 19. The TCTX 195, FIG. 4, polls the TCRX 200 for an ARQ Status bitmap in FIG. 7. The TCRX 200, FIG. 4, generates ARQ status and provides it to the TCTX 195 in FIG. 7. The TCTX 195, FIG. 4, sends the ARQ status PDU to PDU encoder (PENC0 or PENC1, FIG. 3) in FIGS. 6, 7 and 9. The PDU encoder (PENC0 or PENC1, FIG. 3) encodes the PDU and sends the encoder PDU to the CAM 180. The CAM 180 passes the encoder PDU on to SCC 185 in FIG. 7. The SCC 185, FIG. 3, then provides data to the physical Layer 165 in FIG. 21.

Figure 24:
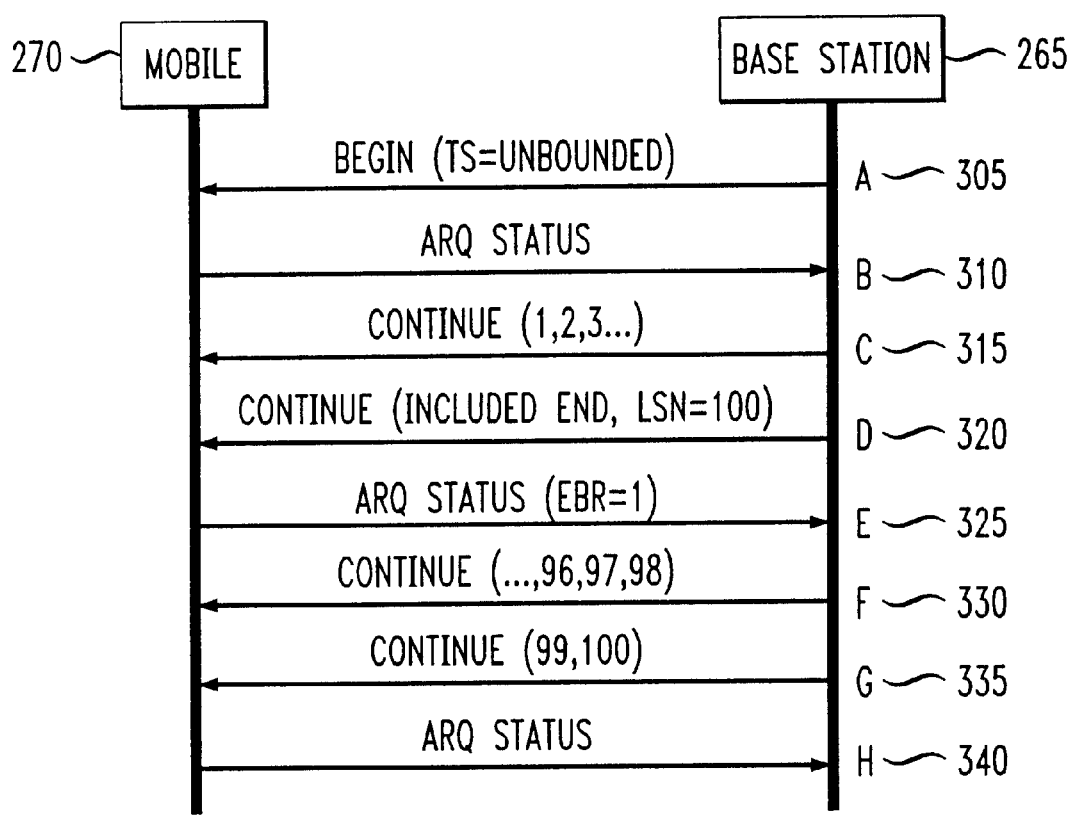
FIG. 24 is a signal flow diagram of an END Procedure for Unbounded Transaction.

FIG. 24 is a signal flow diagram of an END Procedure for Unbounded Transaction. In step 305, the base station 265 sends a BEGIN frame to the mobile 270 indicating that the transaction is unbounded and polls the mobile station 270 for an ARQ Status. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210, FIG. 4 receives the data from CAM 180, FIG. 3, extracts a poll bit (PI), sets ARQ_Status_polled flag=PI and passes the BEGIN PDU to the TCRX 200, FIG. 4 (described in the FIG. 15). The TCRX 200, FIG. 4, receives the BEGIN PDU from the TCRT 210 and sets a last valid sequence number in FIG. 15.

In step 310, the mobile station 270 acknowledges receipt of the BEGIN PDU by sending an ARQ Status PDU to the base station 265. This step was shown in the state diagrams when the SCC 185, FIG. 3, detects a transmission opportunity by reading the PCF and indicates it to CAM 180, FIG. 3, in FIG. 21. The CAM 180, FIG. 3, polls the TCTXs 195 in FIGS. 19 and 20. The TCTX 195, FIG. 4, on the same step, where the Begin PDU is received, indicates to the CAM 180, FIG. 3, that it selectively sent an ARQ status PDU in FIGS. 6, 7 and 9. The CAM 180, FIG. 3, polls TCTX 195, FIG. 4, for ARQ status PDU in FIG. 19. The TCTX 195, FIG. 4, polls the TCRX 200 for an ARQ Status bitmap in FIG. 7. The TCRX 200, FIG. 4, generates ARQ status and provides it to the TCTX 195 in FIG. 7. The TCTX 195, FIG. 4, sends the ARQ status PDU to PDU encoder (PENC0 or PENC1, FIG. 3) in FIGS. 6, 7 and 9. The PDU encoder (PENC0 or PENC1, FIG. 3) encodes the PDU and sends the encoder PDU to the CAM 180. The CAM 180 passes the encoder PDU on to SCC 185 in FIG. 7. The SCC 185, FIG. 3, then provides data to the physical Layer 165 in FIG. 21.

In step 315, the base station 265 sends subsequent CONTINUE PDUs to the mobile 270. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210 receives the data from the CAM 180, FIG. 3 and the TCRX 200, FIG. 4, receives the CONTINUE PDU and updates the RX state in FIG. 16 and 17.

In step 320, while nearing the end of the transaction, the base station 265 includes an END block which indicates the last valid sequence number (set to 100) for the transaction within the CONTINUE PDU. The base station 265 also polls the mobile station 270 for an ARQ status. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). TCRT 210, FIG. 4, receives data from CAM 180, FIG. 3, extracts a poll bit (PI), sets ARQ_Status_polled flag=PI and passes the CONTINUE PDU to the TCRX 200 (FIG. 4) in FIG. 5. The TCRX 200, FIG. 4, receives the CONTINUE PDU, extracts an End block from the CONTINUE PDU and sets the last valid sequence number to that indicated by the End block in FIG. 16. For all other data blocks extracted from the CONTINUE PDU, the TCRX 200, FIG. 4, updates Rx state in FIGS. 16 and 17.

In step 325, the mobile station 270 sends an ARQ status to the base station 265 which acknowledges the receipt of the END block through an End Block received (EBR) field. The ARQ status also includes a bitmap indicating the receipt status of other blocks within the receive window. This step was shown in the state diagrams when the SCC 185, FIG. 3, detects a transmission opportunity by reading the PCF and indicates it to CAM 180, FIG. 3, in FIG. 21. The CAM 180, FIG. 3, polls the TCTXs 195 in FIGS. 19 and 20. The TCTX 195, FIG. 4, on the same step, where the Begin PDU is received, indicates to the CAM 180, FIG. 3, that it selectively sent an ARQ status PDU in FIGS. 6, 7 and 9. The CAM 180, FIG. 3, polls TCTX 195, FIG. 4, for ARQ status PDU in FIG. 19. The TCTX 195, FIG. 4, polls the TCRX 200 for an ARQ Status bitmap in FIG. 7. The TCRX 200, FIG. 4, generates ARQ status with the EBR bit set and provides it to the TCTX 195 in FIG. 7. The TCTX 195, FIG. 4, sends the ARQ status PDU to PDU encoder (PENC0 or PENC1, FIG. 3) in FIGS. 6, 7 and 9. The PDU encoder (PENC0 or PENC1, FIG. 3) encodes the PDU and sends the encoder PDU to the CAM 180. The CAM 180 passes the encoder PDU on to SCC 185 in FIG. 7. The SCC 185, FIG. 3, then provides data to the physical Layer 165 in FIG. 21.

In step 330, the base station 265 sends subsequent CONTINUE PDUs to the mobile 270. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210 receives the data from the CAM 180, FIG. 3 and the TCRX 200, FIG. 4, receives the CONTINUE PDU and updates the RX state in FIG. 16 and 17.

In step 335, the base station 265 sends CONTINUE PDU to the mobile 270 which include blocks 99 and 100, and polls the mobile 270 for an ARQ status. This step was shown in the state diagrams when the SCC 185, FIG. 3, receives data from the physical layer 165 and passes it on to the CAM 180 in FIGS. 21 and 22. The CAM 180, FIG. 3, then receives data from the SCC 185 and the decoded data is provided to the router (TCRT) 210, FIG. 4 (described in the FIG. 19 state diagram). The TCRT 210 receives the data from the CAM 180, FIG. 3 and the TCRX 200, FIG. 4, receives the CONTINUE PDU and updates the RX state in FIG. 16 and 17.

In step 340, the mobile station 270 responds to the mobile 265 with the ARQ status which indicates that all blocks up to and including the last valid sequence number have been received in-sequence. This step was shown in the state diagrams when the SCC 185, FIG. 3, detects a transmission opportunity by reading the PCF and indicates it to CAM 180, FIG. 3, in FIG. 21. The CAM 180, FIG. 3, polls the TCTXs 195 in FIGS. 19 and 20. The TCTX 195, FIG. 4, on the same step, where the Begin PDU is received, indicates to the CAM 180, FIG. 3, that it selectively sent an ARQ status PDU in FIGS. 6, 7 and 9. The CAM 180, FIG. 3, polls TCTX 195, FIG. 4, for ARQ status PDU in FIG. 19. The TCTX 195, FIG. 4, polls the TCRX 200 for an ARQ Status bitmap in FIG. 7. The TCRX 200, FIG. 4, generates ARQ status and provides it to the TCTX 195 in FIG. 7. The TCTX 195, FIG. 4, sends the ARQ status PDU to PDU encoder (PENC0 or PENC1, FIG. 3) in FIGS. 6, 7 and 9. The PDU encoder (PENC0 or PENC1, FIG. 3) encodes the PDU and sends the encoder PDU to the CAM 180. The CAM 180 passes the encoder PDU on to SCC 185 in FIG. 7. The SCC 185, FIG. 3, then provides data to the physical Layer 165 in FIG. 21.

Stated generally, the present invention is a method of implementing a radio link protocol (RLP) completion process for a transaction oriented packet data communication system. The method performs the steps of determining a data backlog (in the buffers TXB0 and TXB1, FIG. 3) with a media access control layer controller (MLC 190), and transmitting a BEGIN PDU containing a flag (transaction size indicator) to a receiver 167. The method further includes the step of initiating a media access control layer transaction (at the MLC 190) in response to the transmitting of the BEGIN PDU. The data backlog is indicated to the media access controller by a network layer 160. The method further includes the steps of stopping data transmission after transmitting the BEGIN protocol data unit, and waiting for an acknowledgment message from the receiver 167. The acknowledgment message from the receiver 167 is controlled by the sub-channel controllers 185.

The present invention is also a transaction oriented packet data communication system. The system comprises a media access control layer controller 190 for determining a data backlog in a media access control layer buffer (TXB0 and TXB1) and a media access control layer transmitter 166 for transmitting a BEGIN PDU containing a flag (transaction size indicator) to a receiver 167. The system also includes a means for initiating (such as MCL 190 or management entity 170) a media access control layer transaction in response to the transmitting of the BEGIN PDU.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed is:

1. A method of implementing a radio link protocol completion process for a transaction oriented packet data communication system, the method comprising the steps of:

determining a data backlog with a media access control layer controller;

transmitting, to a receiver, a BEGIN protocol data unit containing a flag; and initiating a media access control layer transaction in response to the transmitting of the BEGIN protocol data unit;

wherein the media access control layer controller receives an indication of the data backlog from a network layer;

wherein the flag comprises a transaction size indicator;

wherein the media access control layer transaction is composed of a number of data blocks, and the media access control layer transaction has a beginning and an end;

wherein the data blocks are included in a CONTINUE protocol data unit;

wherein the number of data blocks is less than a system broadcast parameter, wherein the BEGIN protocol data unit contains a transaction size field that defines the number of data blocks;

wherein an END control block is transmitted with other data blocks as part of the CONTINUE protocol data unit;

wherein the transaction field values of 1, 2 through $2^N-2$ indicates that the media access control layer transaction has a number of data blocks equal to the value of the transaction size field value.

2. The method of claim 1 further including the step of determining whether a media access control layer transaction is bounded from the flag.

3. The method of claim 1, wherein the data blocks are new data blocks.

4. The method of claim 1, wherein the data blocks are retransmitted data blocks.

5. The method of claim 1, further including the step of committing the media access control layer controller to the end of the media access control layer transaction.

6. The method of claim 1, further including the step of terminating the media access control layer transaction when the transaction size field has a value equal to zero.

7. The method of claim 1, further including the step of transmitting the END control block by the media access control layer controller when the number of data blocks in a transmit buffer is less than the value of the system broadcast parameter.

8. The method of claim 7 further including the step of providing a last valid sequence number for the media access control layer transaction within the END control block.

9. The method of claim 8 further including the step of recovering all of a plurality of data sequence numbers up to and including the last valid sequence number.

10. A transaction oriented packet data communication system comprising:
a media access control layer controller for determining a data backlog in a media access control layer buffer;
a media access control layer transmitter for transmitting a BEGIN protocol data unit containing a flag to a receiver; and
means for initiating a media access control layer transaction in response to the transmitting of the BEGIN protocol data unit;
wherein the flag comprises a transaction size indicator;
wherein the number of data blocks is less than a system broadcast parameter;
wherein the BEGIN protocol data unit contains a transaction size field that defines the number of data blocks; and
wherein the END control block is transmitted with other data blocks as part of a CONTINUE protocol data unit;
wherein the transaction size field values of 1, 2 through $2^N-2$ indicate that the media access control layer transaction has a number of data blocks equal to the value of the transaction size field value.

11. The system of claim 10 further including a transmission controller for determining whether the media access control layer transaction is bounded from the flag.

12. The system of claim 11 further including an explicit END control block which is transmitted by the media access control layer controller when the number of data blocks in a transmit buffer is less than the value of the system broadest parameter.

13. The system of claim 12 further including a last valid sequence number for the media access control layer transaction within the END control block.

14. The system of claim 12 further including a receiver for recovering all of a plurality of data sequence numbers up to and including the last valid sequence number.

15. The system of claim 11 wherein the media access control layer transaction is composed of a number of a number of data blocks, and the media access control layer transaction has a beginning and an end.

16. The system of claim 15 wherein the data blocks are included in a CONTINUE protocol data unit.

17. The system of claim 16 wherein the BEGIN protocol data unit contains a transaction size field that defines the number of data blocks.

18. The system of claim 11 wherein the media access control layer transaction is composed of a number of a number of data blocks, and the media access control layer transaction has a beginning and an end.

19. The system of claim 18 wherein the data blocks are included in a CONTINUE protocol data unit.

20. The system of claim 19 wherein the data blocks are new data blocks.

21. The system of claim 19 wherein the data blocks are retransmitted data blocks.

22. The system of claim 18 wherein the transmission controller commits to the end of the media access control layer transaction.

23. The system of claim 10, wherein the transmission controller terminates the media access control layer transaction when the transaction size field has a value equal to zero.

24. A transaction oriented packet data communication system comprising:
a media access control layer controller for determining a data backlog in a media access control layer buffer;
a media access control layer transmitter for transmitting a BEGIN protocol data unit containing a flag to a receiver; and
means for initiating a media access control layer transaction in response to the transmitting of the BEGIN protocol data unit;
wherein the flag comprises a transaction size indicator;
wherein the number of data blocks is less than a system broadcast parameter;
wherein the BEGIN protocol data unit contains a transaction size field that defines the number of data blocks;
wherein the END control block is transmitted with other data blocks as part of a CONTINUE protocol data unit;
wherein the media access control layer transaction is bounded when the transaction size field has a value equal to $2^N-1$ where N is bit size of the transaction size field.

25. A transaction oriented packet data communication system comprising:
a media access control layer controller;
means for determining a data backlog with the media access control layer controller
means for transmitting a BEGIN protocol data unit containing a flag to a receiver; and
means for initiating a media access control layer transaction in response to the transmitting of the BEGIN protocol data unit;
wherein the flag comprises a transaction size indicator;
wherein the number of data blocks is less than a system broadcast parameter;
wherein the BEGIN protocol data unit contains a transaction size field that defines the number of data blocks;
wherein the END control block is transmitted with other data blocks as part of a CONTINUE protocol data unit;
wherein the transaction field values of 1, 2 through $2^N-2$ indicate that the media access control layer transaction has a number of data blocks equal to the value of the transaction size field value.

26. The system of claim 25 further including means for determining whether a media access control layer transaction is bounded from the flag.

27. The system of claim 26 further including an explicit END control block which is transmitted by the media access control layer controller when the number of data blocks in a transmit buffer is less than the value of the system broadest parameter.

28. The system of claim 27 further including a last valid sequence number for the media access control layer transaction within the END control block.

29. The system of claim 27 further including a receiver for recovering all of a plurality of data sequence numbers up to and including the last valid sequence number.

30. The system of claim 26 wherein the media access control layer transaction is composed of a number of a number of data blocks, and the media access control layer transaction has a beginning and an end.

31. The system of claim 30 wherein the data blocks are included in a CONTINUE protocol data unit.

32. The system of claim 31 wherein the BEGIN protocol data unit contains a transaction size field that defines the number of data blocks.

33. The system of claim 26 wherein the media access control layer transaction is composed of a number of a number of data blocks, and the media access control layer transaction has a beginning and an end.

34. The system of claim 33 wherein the data blocks are included in a CONTINUE protocol data unit.

35. The system of claim 34 wherein the data blocks are new data blocks.

36. The system of claim 34 wherein the data blocks are retransmitted data blocks.

37. The system of claim 33 further including means for committing the media access control layer controller to the end of the media access control layer transaction.

38. The system of claim 25, further including means for terminating the media access control layer transaction when the transaction size field has a value equal to zero.

39. A transaction oriented packet data communication system comprising:

a media access control layer controller;

means for determining a data backlog with the media access control layer controller means for transmitting a BEGIN protocol data unit containing a flag to a receiver; and means for initiating a media access control layer transaction in response to the transmitting of the BEGIN protocol data unit;

wherein the flag comprises a transaction size indicator, wherein the number of data blocks is less than a system broadcast parameter;

wherein the BEGIN protocol data unit contains a transaction size field that defines the number of data blocks;

wherein the END control block is transmitted with other data blocks as part of a CONTINUE protocol data unit;

wherein the determining means determines that the media access control layer transaction is bounded when the transaction size field has a value equal to $2^N-1$ where N is bit size of the transaction size field.

* * * * *